(12) United States Patent
Miyata

(10) Patent No.: US 7,701,605 B2
(45) Date of Patent: Apr. 20, 2010

(54) INFORMATION PROCESSING APPARATUS, PROCESS CONTROL METHOD, AND PROGRAM THEREOF

(75) Inventor: Junichi Miyata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1103 days.

(21) Appl. No.: 11/352,689

(22) Filed: Feb. 13, 2006

(65) Prior Publication Data

US 2006/0197977 A1 Sep. 7, 2006

(30) Foreign Application Priority Data

Mar. 2, 2005 (JP) ............... 2005-058062

(51) Int. Cl.
*G06F 3/12* (2006.01)
(52) U.S. Cl. ............... 358/1.15; 358/1.13; 358/1.18; 358/1.9
(58) Field of Classification Search ............... 358/1.15, 358/1.13, 1.18, 1.9
See application file for complete search history.

(56) References Cited

U.S. PATENT DOCUMENTS 6,985,245 B1 * 1/2006 Takahashi ............... 358/1.15

2004/0109191 A1 * 6/2004 Ohshima ............... 358/1.13

FOREIGN PATENT DOCUMENTS

| JP | 2001195220 A | * | 7/2001 |
| JP | 2002-063004 A | | 2/2002 |

OTHER PUBLICATIONS

Patent Family Data (USPN 6,985,245 B1), Jul. 20, 2009.*

* cited by examiner

*Primary Examiner*—Benny Q Tieu
*Assistant Examiner*—Quyen Ngo
(74) *Attorney, Agent, or Firm*—Canon U.S.A., Inc. I.P. Division

(57) ABSTRACT

A workflow scheduler is provided in which highly correlated processes are scheduled so as to be continuously executed. The workflow scheduler analyzes an input print order, divides the print order into a plurality of processes to carry out the print order, arranges a schedule of the plurality of processes divided, groups a set of processes together from the plurality of processes into which the print order is divided according to grouping attributes of the plurality of processes, the set of processes being associated with each other by the grouping attributes, outputs the plurality of processes whose schedule is arranged by the schedule arranging unit in a recognizable manner, and arranges the schedule of the plurality of processes such that the set of processes is capable of being executed continuously.

14 Claims, 23 Drawing Sheets

| JOB TYPE ID | PROCESS ID | ESTIMATED OPERATION TIME | AFFILIATED GROUP ID | GROUP ID | MOVEMENT ATTRIBUTE |
|---|---|---|---|---|---|
| CASE-BINDING PRINT | FOLDER INPUT | 1 | GROUP 1 | GROUP 1 | UNMOVABLE |
| | IMPOSITION | 1 | GROUP 1 | GROUP 2 | MOVABLE |
| | PRINT | 1 | GROUP 2 | | |
| | CASE BINDING | 1 | GROUP 2 | | |
| | | | | | |
| | | | | | |
| | | | | | |
| | | | | | |

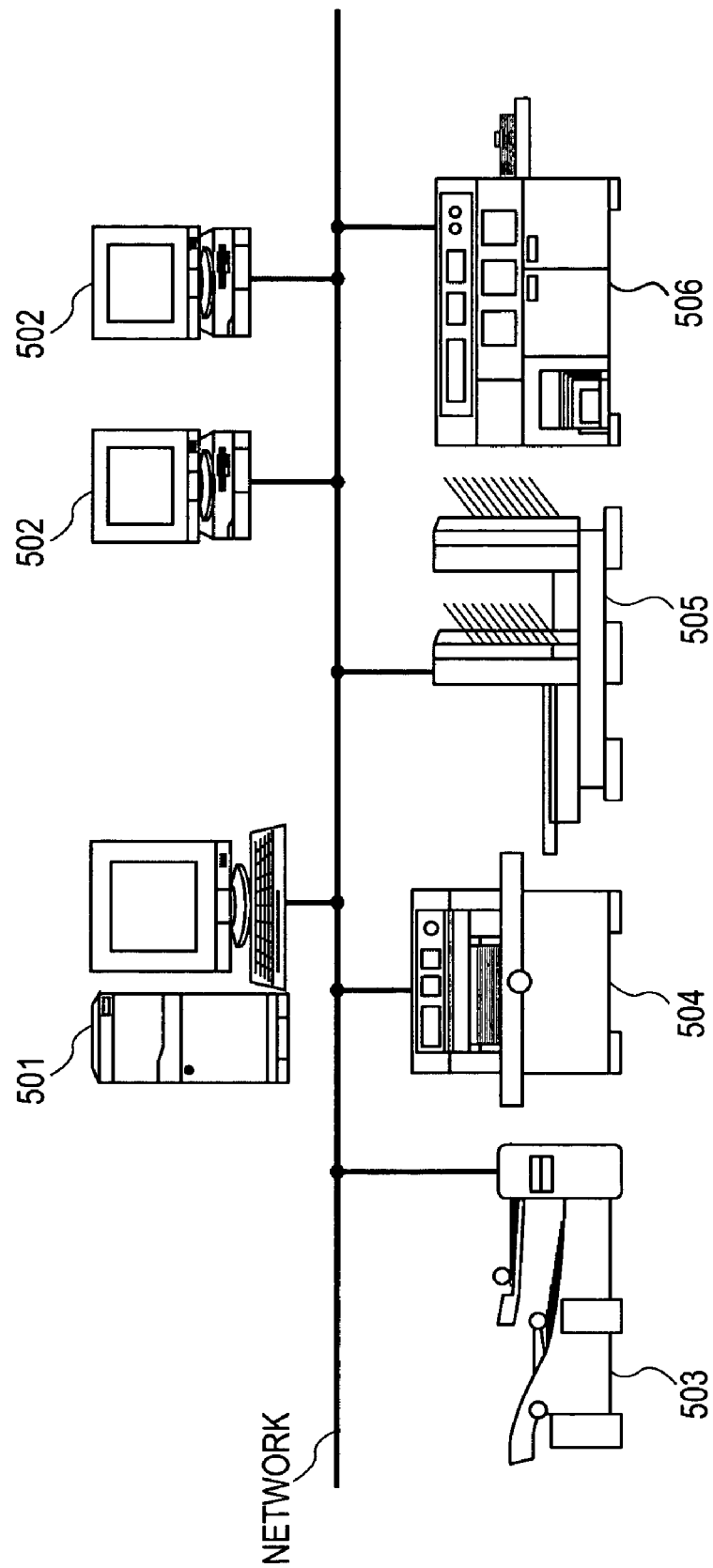

FIG. 7A

| JOB TYPE ID (701) | PROCESS ID (702) | ESTIMATED OPERATION TIME (703) | AFFILIATED GROUP ID (704) | GROUP ID (705) | MOVEMENT ATTRIBUTE (706a) |
|---|---|---|---|---|---|
| | | | | | |
| | | | | | |
| | | | | | |
| | | | | | |
| | | | | | |
| | | | | | |
| | | | | | |
| | | | | | |
| | | | | | |

FIG. 7B

| JOB TYPE ID | PROCESS ID (707) | ESTIMATED OPERATION TIME (708) | AFFILIATED GROUP ID | GROUP ID (713) | MOVEMENT ATTRIBUTE (706b) |
|---|---|---|---|---|---|
| CASE-BINDING PRINT | FOLDER INPUT | 1 | GROUP 1 | GROUP 1 | UNMOVABLE |
| | IMPOSITION | 1 | GROUP 1 | GROUP 2 | MOVABLE |
| 709 | PRINT | 1 | GROUP 2 | | 714 |
| 710 | CASE BINDING | 1 | GROUP 2 | | 712 |
| | | 711 | | | |
| | | | | | |
| | | | | | |

FIG. 19

Web Ordering Service

File  Edit  View  Favorites  Tools  Help

Back ▶  Address http://192.168.100.21/WebOrderService.htm

Search

Client | Logout

■ Changes of Output Settings
■ Please change the number of pages and/or output settings.

[File to be sent]

File Name 1. simpleguide.pdf    Number of Pages  [20] pages

[Output Settings]

| Finished Size | A4 (210mm×297mm) ▶ |
| Document Adjustment | ☐ Scale to Fit Finished Size |
| Orientation | ⦿ Portrait  ○ Landscape |
| Binding Type | Case-Binding Print ▶ |
| Binding Direction | ⦿ Left  ○ Right  ○ Top  ○ Others |
| Print | ⦿ Single-sided  ○ Double-Sided |
| Color Mode | ○ Color  ⦿ Monochrome |
| Paper | Standard Paper for Monochrome Print ▶ |

INFORMATION PROCESSING APPARATUS, PROCESS CONTROL METHOD, AND PROGRAM THEREOF

BACKGROUND OF THE INVENTION

1. Field of the Invention

The present invention relates to a workflow scheduler (an information processing apparatus and a program thereof) serving as a process control system for use in a print system that receives a document from a user and outputs (prints and/or binds) the document.

2. Description of the Related Art

The commercial printing industry is an industry that accepts orders for creation of printed matter (e.g., magazines, newspapers, catalogs and advertisements) from third parties (e.g., customers, or clients), creates printed matter that the clients require, delivers the printed matter to the clients, and receives payment for such products. To produce such products, large-scale printing machines, such as offset presses, are now becoming mainstream. Work in such a commercial printing industry involves various processes: document reception, design, layout, comprehensive layout (presentation using output from printers), which is usually shortened to comp, proofing (correction in layout and color), trial impression (proof printing), preparation of plate for printing, printing, postpress processing, dispatch, and the like.

The reason for the presence of the various steps is that the use of the above printing machine requires preparation of the plate for printing, and once the plate for printing has been prepared, correction of the plate is difficult and highly disadvantageous in terms of cost. Therefore, careful proofing, that is, a confirmatory check of layout and color is necessary. In summary, the printing industry requires large-scale printing machines and needs a certain amount of time and certain kinds of tasks to create printed matter that a client requires. Additionally, individual tasks require expert knowledge, i.e., expertise of skilled laborers.

Recently, with the increasing speed and resolution of electrophotographic printers and inkjet printers, a "Print on Demand" (POD) market has emerged as a competitor of the traditional printing industry. Print on Demand is a technology that aims to be capable of handling jobs with volumes relatively smaller than those handled in traditional printers on short lead times without using larger-scale printers or systems, like offset presses, and that makes full use of digital image forming devices, such as digital copiers, digital multifunction peripherals, and the like, instead of the use of the larger-scale printers and printing methods described above, and realizes digital printing using electronic data.

Compared to the traditional printing industry, such a POD market has become more digitized and computer-controlled, and the POD market is approaching the level of the traditional printing industry to some extent by using computers. Under such circumstances, in the POD market, the "print-for-pay" (PFP) service, which is a print service provided by copy and print shops, and the centralized reproduction department (CRD) service, which is an in-house print service in corporations, are available.

In providers of these print services, persons in charge determine the processing sequence and the processing time of requests from a specified or unspecified large number of customers solely on the basis of their estimates or experience with consideration of the number of printing pages, the delivery time, or restrictions of human and material resources (task assignments). In accordance with the determined schedules, in the case of paper documents, specified documents are copied with copiers, and in the case of electronic documents, specified files are printed out with printers connected to personal computers. Then, the providers perform final checks and collations, and deliver the products to the customers.

The task assignments performed by conventional methods described above are not necessarily efficient. In particular, in the case of a multiple-process task, if processes are closely correlated with one another, executing the correlated processes continuously is more efficient in some cases. However, such an efficient task assignment is difficult when the task assignment is solely dependent on estimates or experience of a person in charge. One way to address this problem is to provide a process control device having a function of allowing a user to intuitively grasp a schedule of the entire printing system and dynamically change a processing date and time and/or a processing subject of each printing job with an intuitive operation, as in Japanese Patent Laid-Open No. 2002-063004.

In the case of a multiple-process task, if processes are closely correlated with one another, executing the correlated processes continuously is more efficient in some cases. According to conventional methods, as discussed in Japanese Patent Laid-Open No. 2002-063004, print jobs are only assigned appropriately to printers on the basis of the schedule of each printer. In a case where various processes (e.g., proof printing, final printing, and postpress processing) are included in a single print order, different devices, such as a printer and a postpress processing device (e.g., folder and cutter), are assigned to the individual processes. According to the scheduling method discussed in Japanese Patent Laid-Open No. 2002-063004, different processes are controlled as independent processes. In other words, this scheduling method does not consider a case in which multiple processes are executed continuously to increase efficiency. Furthermore, according to this scheduling method, all schedules up to the current process are subjected to optimization of the subsequent scheduling. Therefore, even when multiple processes have been optimized in an integral manner, the determination whether schedules can be changed throughout all processes is performed again or the optimization of schedules is performed again at a time when the subsequent process is scheduled.

SUMMARY OF THE INVENTION

The present invention provides an information processing apparatus, a process control method, and a program for use in a process control system that performs control in such a way that correlated processes are assigned so as to be continuously executed when a plurality of processes created from a single print order are scheduled.

According to a first aspect of the present invention, an image processing apparatus for controlling a schedule of processes constituting a workflow to carry out a print order includes a dividing unit, a schedule arranging unit, a grouping unit, and a first output unit. The dividing unit is configured to analyze an input print order and divide the print order into a plurality of processes to carry out the print order. The schedule arranging unit is configured to arrange a schedule of the plurality of processes. The grouping unit is configured to group a set of processes together from the plurality of processes according to grouping attributes of the plurality of processes, the set of processes being associated with each other by the grouping attributes. The first output unit is configured to output the plurality of processes whose schedule is arranged by the schedule arranging unit in a recognizable manner. In the image processing apparatus, the schedule arranging unit is configured to arrange the schedule of the plurality of processes such that the set of processes is capable of being executed continuously.

Further embodiments, aspects and features of the present invention will become apparent from the following description of exemplary embodiments with reference to the attached drawings.

BRIEF DESCRIPTION OF THE DRAWINGS

FIG. 5 is a block diagram of a postpress section according to the first exemplary embodiment of the present invention.

FIGS. 7A and 7B illustrate an example of a process setting file created by a workflow editor.

FIG. 19 illustrates an example of a screen displaying output settings specified when a document is input according to the first exemplary embodiment.

DESCRIPTION OF THE EMBODIMENTS

First Exemplary Embodiment

Figure 1:
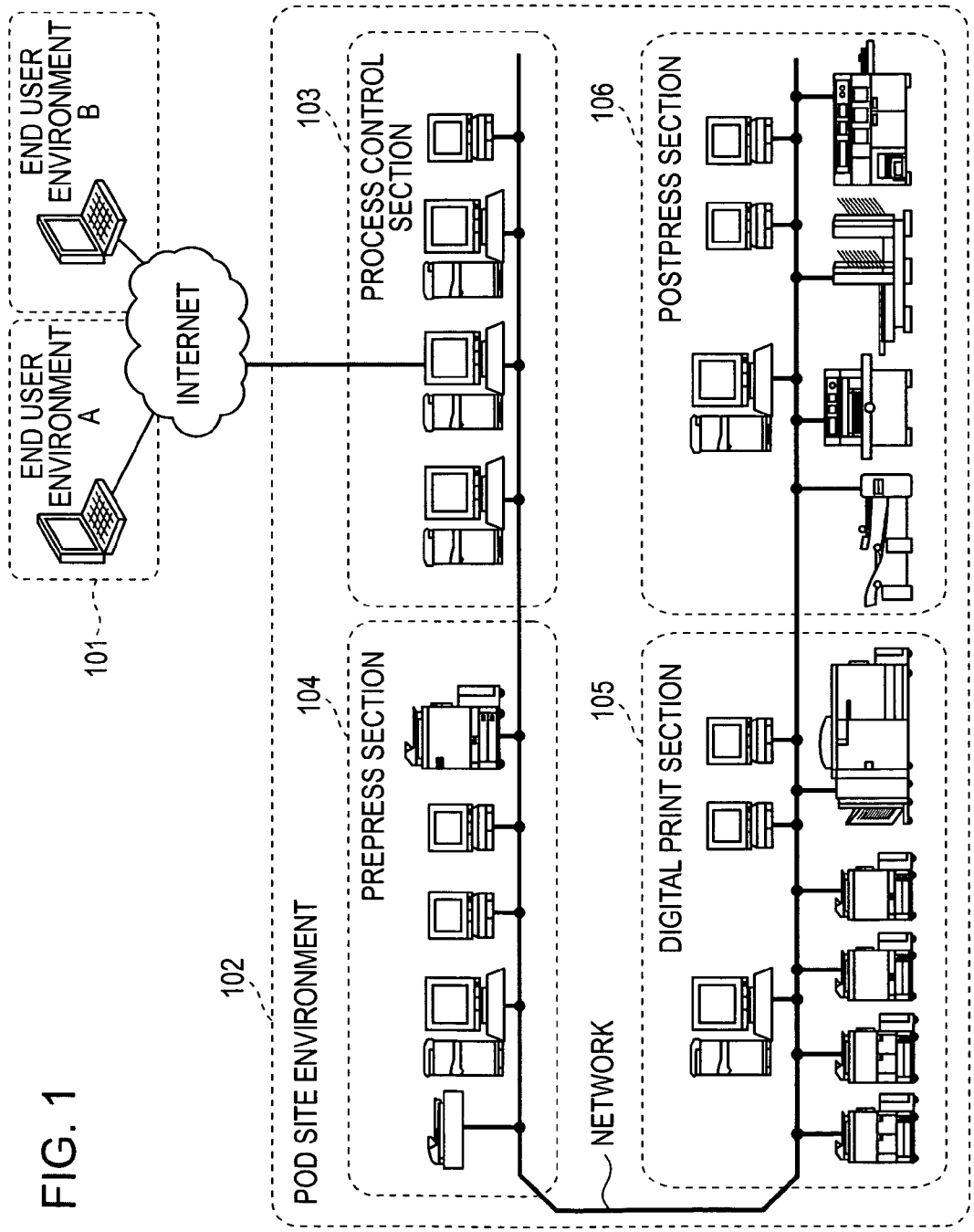
FIG. 1 is a block diagram of a system in general according to a first exemplary embodiment of the present invention.

Exemplary embodiments of the present invention are described below with reference to the drawings. FIG. 1 is a block diagram showing an example of a topological architecture of a print system in general according to a first exemplary embodiment of the present invention.

The exemplary system includes one or more end user environments 101 and a print on demand (POD) site environment 102 connected thereto over the Internet. The end user environments 101 include a customer who can place a print order. Customers can place an order for a print job with the POD site environment 102 and check the status of the print job to the POD site environment 102 from the end user environments (here, an end user environment A and an end user environment B) via respective client personal computers (PCs).

The POD site environment 102 includes a process control section 103, a prepress section 104, a digital print section 105, and a postpress section 106. The process control section 103 provides instructions as to tasks in the processes to the prepress section 104, the digital print section 105, and the postpress section 106 in the POD site environment 102. The process control section 103 also performs centralized management on a workflow in a system composed of computers and devices, and more specifically, receives jobs from the end user environments, stores the received jobs, constructs the tasks in the processes in the form of a workflow according to the specifications of the received jobs, and efficiently schedules the tasks in devices and operators.

In accordance with the instructions concerning prepress jobs from the process control section 103, the prepress section 104 functions to scan pages of the document sheet with a scanning device (e.g., multifunction peripheral (MFP)) to capture the document sheet as a scanned image file in a prepress server or a work PC in a case where a job from an end user deals with a paper document, perform image correction, merge files, insert/delete a page, lay out pages, and impose pages. Additionally, the prepress section 104 functions to output a proof sheet to check layout and color of a final product if necessary.

In accordance with the instructions concerning print jobs from the process control section 103 or the prepress section 104, the digital print section 105 functions to make a copy of a document sheet received from an end user with a monochrome MFP or color MFP and produce printed output of a document/image file that is received from an end user via a printer driver or hot folder (described later), a scanned image file captured by a scanning device, an edited document/image file that is edited from the received file or scanned file with the monochrome MFP or color MFP from a work PC.

In accordance with the instructions concerning postpress jobs from the process control section 103, the prepress section 104, or the digital print section 105, the postpress section 106 controls postpress devices, such as a paper-folding machine, a saddle stitching machine, a case-binding machine, a cutting machine, an inserter, and a collator, and performs finishing processing, such as paper folding, saddle stitching, case binding, cutting, inserting, and collating, on recording paper output from the digital print section 105.

Figure 2:
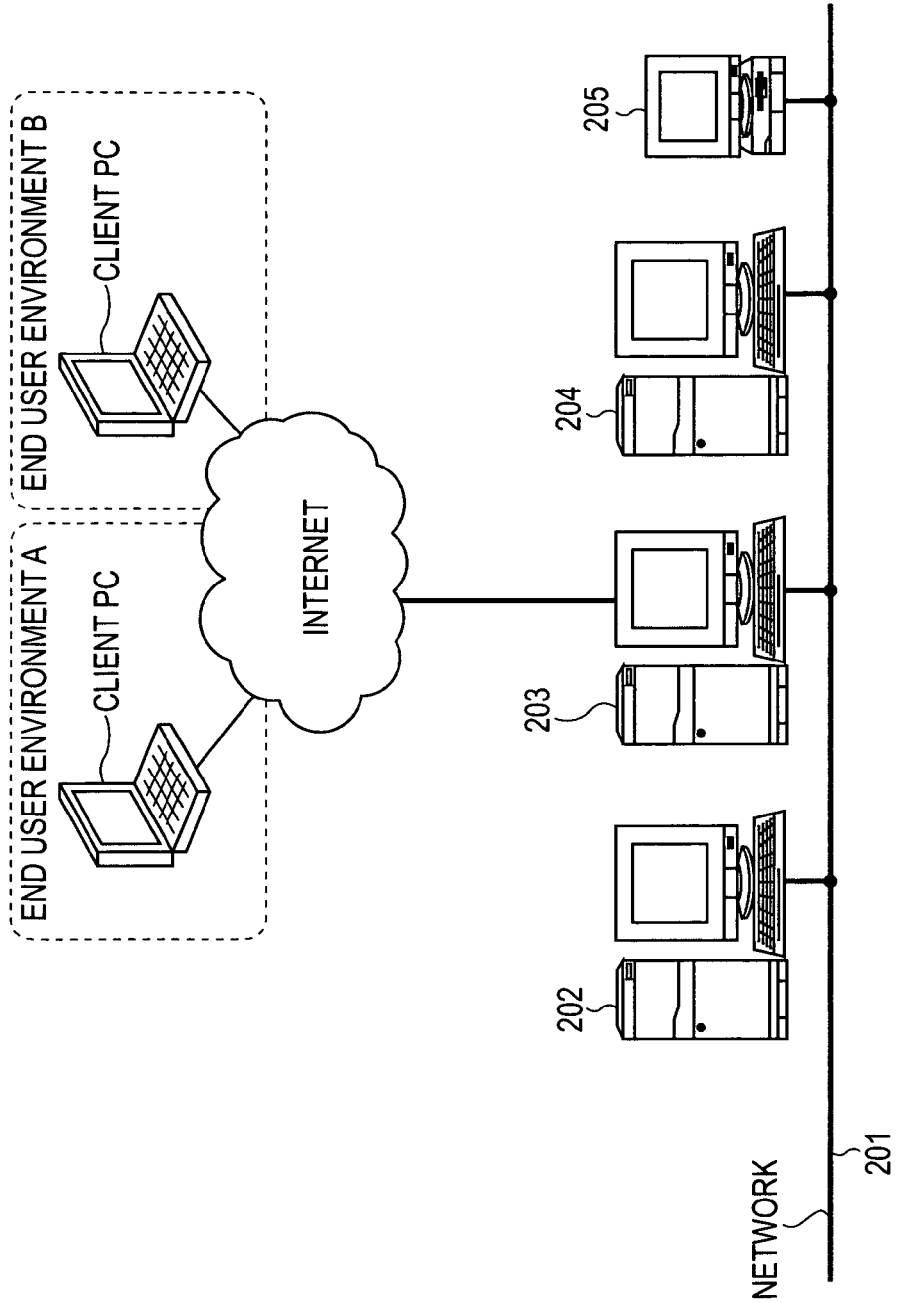
FIG. 2 is a block diagram of a process control section according to the first exemplary embodiment of the present invention.

FIG. 2 is a block diagram showing the details of an exemplary structure of the process control section 103. The process control section 103 includes a Management Information System (MIS) server 202 connected to a network 201, an order server 203, a file server 204, and a work PC 205. The MIS server 202 is a system that manages a workflow in the entire system from order to delivery and controls various kinds of management information and sales information.

The MIS server 202 serves one of the main functions of the process control section 103 and is a system server which functions as an administrative information system or business management system which collects and analyzes information required for decision making in business administration and management. The MIS server 202 in general serves as a system that controls various kinds of management information and marketing information, including information regarding advertisements, orders, estimates, plans, production, shipment, stock, purchase, sales, and the like. In particular, the MIS server 202 in the printing industry serves as a printing manufacturing process control system, and more specifically, performs centralized management of printing manufacturing equipment and resources and can provide a mechanism for automating a total workflow from order to delivery or even to payment acceptance by using a job ticket in Job Definition Format (JDF) which describes task instructions for jobs.

The MIS server 202 according to the first exemplary embodiment of the present invention serves as a server computer that functions as the center of this business management system and controls the workflow in the system composed of computers and various devices by issuing a JDF job ticket in which task instructions for each job are described to each process in the POD site environment 102 in accordance with job specifications from an end user. The MIS server 202 exchanges messages in Job Messaging Format (JMF) with each process in the POD site environment 102 and obtains information about functions and capabilities of each device, status information on each device, and progress information on an accepted job. The MIS server 202 performs centralized management of the workflow in the system on the basis of the obtained information.

The MIS server 202 incorporates workflow editing capability and scheduling capability for managing the schedule of jobs and devices and cooperates with an application having these capabilities. By construction of tasks in processes as a workflow and provision of instructions to execute each task and by arrangement of efficient schedule of the tasks in the devices and operators, the workflow in the processes can be automated.

The order server 203 is a server that receives a job from each of the end user environments 101 over the Internet. The received job is managed by a job identification (ID) number. The job ID number and information required for management are sent to the MIS server 202. The order server 203 sends information required for order implementation, such as input data and print settings, to downstream processes, including the prepress section 104, the digital print section 105, and the postpress section 106, in accordance with the instructions from the MIS server 202. The order server 203 acts as an intermediary in electronic commerce (EC) in the POD and as a server that deals with job ordering between the system and the client PCs in the end user environments 101 via a communication medium, such as the Internet. From a view of the end user environments 101, the order server 203 is typically an online store, which uses web pages on the Internet.

For example, in the case of a print job order, a user authentication is performed from the client PC in the end user environment 101, and print condition settings, which specify print conditions to be output, and other print request information are then input. Then, a document/image file that serves as a print subject is sent as electronic data together with the print condition settings and other print request information from the client PC in the end user environment 101 to the order server 203. In this way, the MIS server 202 functioning as a web server receives a print job order.

The order server 203 or each client PC in the end user environments 101 may have a hot folder (not illustrated), allowing a document/image file that serves as a print subject and the accompanying print condition settings and other print request information to be transferred as data. Hot folders are virtual folders that include print condition settings and other print request information as attributes and can be created in a memory (not illustrated) in the order server 203 or each client PC in the end user environments 101.

For example, when an end user drags and drops a document/image file that serves as a print subject from each client PC in the end user environments 101 into a hot folder, the order server 203 or a monitoring program in each client PC in the end user environments 101 then detects the presence of the document/image file and associates the file with the print condition settings and other print request information accompanying the hot folder, thus allowing the order server 203 to read the information.

In the case of a copy job order, instead of sending a document/image file as electronic data, a document sheet which is a subject to be copied is sent separately as a physical medium via a courier service, and only copy condition settings, which specify copy conditions to be output, and other copy request information are input from a browser of the client PC in the end user environments 101. In this case, an operator in a print service provider determines association of the document sheet separately sent as a copy subject with the copy condition settings and other copy request information input to the order server 203.

The file server 204 is a document management server that stores a job received from an end user to prepare for a repeat order of the same document sheet from the end user. The file server 204 usually stores image data together with job setting information regarding the previous output (job ticket). The work PC 205 is a client PC that allows information managed by the MIS according to the first exemplary embodiment of the present invention and screens of a workflow editor and a scheduler, which are described later, to be displayed and set by remote operation.

The MIS server 202, the order server 203, and the file server 204 in the process control section 103 exchange information with one another by using job tickets in which task instructions of a job are described in JDF. The process control section 103 can provide automation of a total workflow in conjunction with the prepress section 104, the digital print section 105, and the postpress section 106 by transferring a job and issuing a control command.

Figure 3:
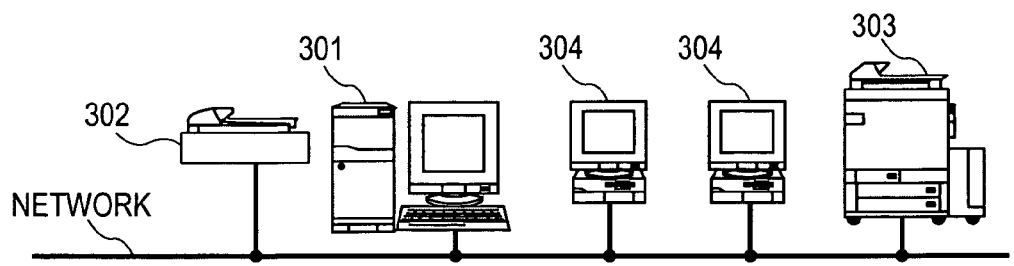
FIG. 3 is a block diagram of a prepress section according to the first exemplary embodiment of the present invention.

FIG. 3 is a block diagram of an exemplary structure of the prepress section 104. A prepress server 301 is a server used for scanning pages of a document sheet received from an end user with a scanning device, such as a scanner 302 and an MFP 303, to capture the document sheet as a scanned image file and for performing various page layout editing and imposition processing. Examples of the various page layout editing and imposition processing include image correction, such as skew correction and noise elimination process, merging document/image files received from an end user or scanned image files captured with the scanning device, insertion/deletion of a page, addition of a page number or an annotation (text or an image of watermark indicating confidentiality or a logotype), insertion of a index sheet, a cover, or an interleaf, and selection of N-in-1 printing or image combination printing (printing of multiple pages laid out on one).

A work PC 304 is a client PC that allows tasks in the prepress server 301 to be performed from the client. As illustrated in the Figures, the prepress section 104 may include one prepress server 301 and a plurality of work PCs 304. Alternatively, the prepress section 104 may include only the work PCs 304 without the prepress server 301.

In a case where a job received from an end user requests copying, an operator first scans a document sheet with a scanning device, such as a scanner, or an MFP, to capture the document sheet in the prepress server 301 or the work PC 304 as a scanned image file. If the scanned image includes a skewed page, the skewed page can be corrected by performing skew correction. If the scanned image includes a punch hole or noise, the punch hole or the noise can be eliminated by performing noise elimination process.

In a case where a job received from an end user requests printing, an operator first captures a document/image file received from the end user in the prepress server 301 or the work PC 304. If a plurality of document/image files or scanned image files captured with a scanning device is present, the files are merged.

If further editing is necessary for the document/image file received from the end user or the scanned image file captured with the scanning device, for example, an operator may insert a page into an editing file from another file or delete a page in the editing file while checking the layout of a plurality of pages. Moreover, an operator may various page layout editing and imposition processing. Examples of the processing include addition of a page number or annotation, selection of N-in-1 printing or image combination printing, insertion of an index sheet, a cover, or an interleaf, and selection of postpress processing, such as stapling, punching, or Z-folding.

The prepress section 104 may be structured as a variable printing system, in which multiple copies of the same document are printed while an address or other related data is continuously replaced with another one, in conjunction with the prepress server 301 or a database constructed in another server, to realize a one-to-one marketing, such as printing addresses for direct mail, brochures for individual customers, or the like.

In the printing industry, before plate-making and printing processes, an output process of a color comp (color comprehensive layout) to make a presentation to an advertiser is present. These days, as such a color comp, a color hard copy is used in which a digital color image processed by desktop publishing (DTP), which produces a publication using a personal computer, or by color electronic prepress systems (CEPS), which are used for image correction or image composition in a print process, is output from a color printer, such as a color MFP, or a color plotter.

POD using a printer, such as an MFP, can output proof sheets from the same color printer, such as a color MFP (or a monochrome printer, such as a monochrome MFP), as that used in a confirmatory check of layout which corresponds to comp and a simple check of color and a detailed check of color. Therefore, the prepress section 104 can output proof sheets from the MFP 303 in order to allow the layout or color of a final product to be checked when necessary. The prepress server 301, the work PC 304, the scanner 302, and the MFP 303 in the prepress section 104 are connected to each other via a network, so that jobs can be transferred and control commands can be issued therebetween. In this way, jobs received in the prepress section 104 can be processed.

Figure 4:
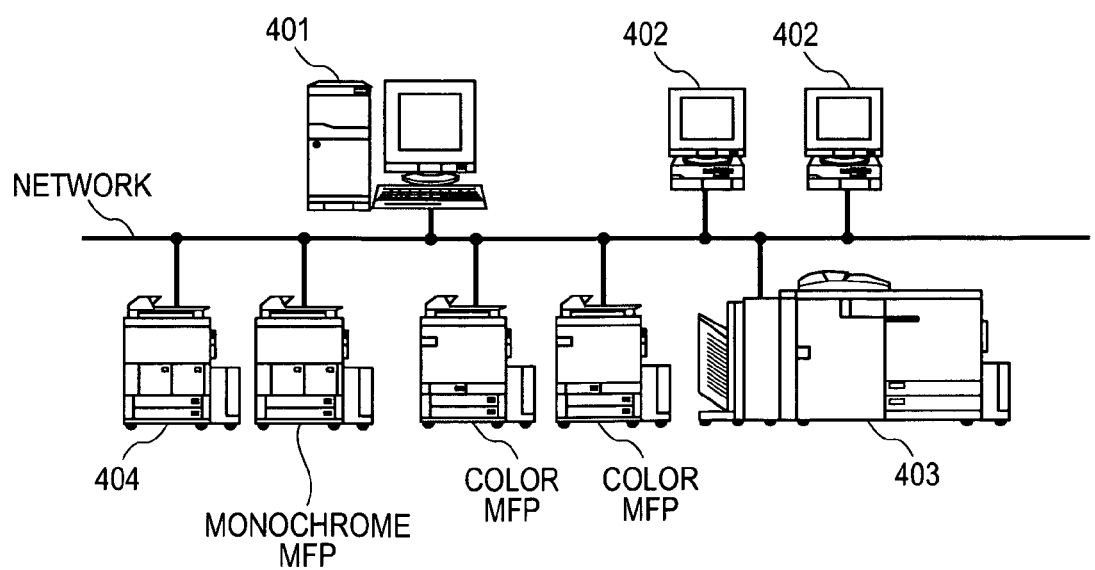
FIG. 4 is a block diagram of a digital print section according to the first exemplary embodiment of the present invention.

FIG. 4 is a block diagram of an exemplary structure of the digital print section 105. The digital print section 105 includes at least one print server 401, one or more work PCs 402, one or more color MFPs 403, and one or more monochrome MFPs 404.

The print server 401 usually serves the following two functions. One is to transmit information to and receive information from the sections outside the digital print section 105. Information about images and settings of an input job is first input to the print server 401. The print server 401 serves a function of informing the outside sections of status information or other information when the job is complete. The other function is to manage and control the inside of the digital print section 105. The print server 401 performs centralized management on an externally input job and a job occurring inside the digital print section 105. The print server 401 can monitor the statuses of all devices and jobs present in the digital print section 105. Additionally, the print server 401 can cause a job to pause, change the settings, resume printing, duplicate a job, move a job, delete a job, and perform other control activities.

Each of the work PCs 402 serves a function of editing an input application file, providing instructions to print, or supplying a ready-to-print file and an auxiliary function of monitoring and controlling devices and jobs managed in the print server 401. Each of the color MFPs 403 and the monochrome MFPs 404 is an image forming apparatus that has various functions, including scanning, printing, and copying. Since the color MFP 403 and the monochrome MFP 404 are different from each other in terms of processing speeds, costs, and other conditions, it is necessary to select one, depending on the intended use.

FIG. 5 is a block diagram of an exemplary structure of the postpress section 106. The postpress section 106 includes a postpress server 501, a work PC 502, postpress processing devices, typified by a paper-folding machine 503, a cutting machine 504, a saddle-stitching machine 505, and a casing-in machine 506.

The postpress server 501 is a computer that performs centralized control of postpress processing, sets conditions for postpress processing that is capable of being finished in the postpress section 106 in accordance with job instructions received in the order server 203 or provided from the MIS server 202, and provides instructions for postpress processing (finishing) that meets a request from an end user. In general, the postpress server 501 exchanges information with the sections outside the postpress section 106 by using a unit for exchanging information, such as a JDF job ticket, and with the postpress processing devices by using a command or status in the postpress section 106.

The postpress processing devices can be classified into the following three categories:

(1) In-line finisher: A postpress processing device in which its paper path is physically connected to the MFP and operational instructions and status confirmation are electrically connected to the MFP.

(2) Near-line finisher: A postpress processing device, in which its paper path is not connected to the MFP, so that an operator transports an output product and performs the settings of the output product, and information regarding operational instructions and status confirmation can be electrically exchanged with the MFP via a communication unit, such as a network.

(3) Off-line finisher: A postpress processing device in which its paper path, operational instructions, and status confirmation are not connected to the MFP. Therefore, an operator transports an output product, performs the settings of the output product, manually inputs operations, and visually identifies the status indication of a device.

Furthermore, the postpress processing devices perform various kinds of sheet processing, including a cutting process, a saddle stitching processing, a casing-in process, a paper-folding process, a punching process, an inserting process, a collating process, and other binding processes, on recording paper printed by an image forming apparatus, such as an MFP. The postpress processing devices are controlled so as to realize a binding form to be provided to an end user.

Examples of the near-line finishers (including the off-line finishers in some cases) managed by the postpress server 501 include the paper-folding machine 503, the cutting machine 504, the saddle-stitching machine 505, the casing-in machine 506, as shown in FIG. 5, a stapling machine, a punching machine, an inserting machine, a collator, and various other machines. The postpress server 501 keeps track of the state of each device and job by polling the near-line finishers using a predetermined protocol to manage the progress of each job. In the first exemplary embodiment, the multiple kinds of sheet processing described above may be executable by the respective sheet processing devices or by a single sheet processing device. Alternatively, any of the sheet processing devices may be included in the system.

Figure 6A:
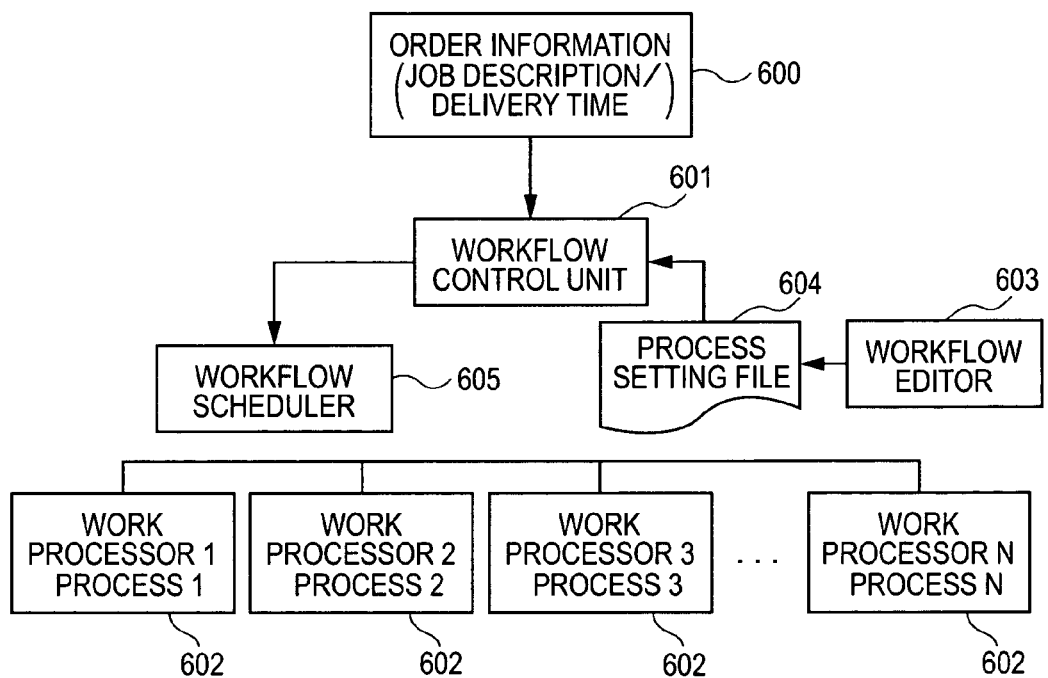
FIGS. 6A and 6B are block diagrams of an exemplary module structure in the process control section, the prepress section, the digital print section, and the postpress section.

FIG. 6A schematically illustrates the prepress section 104, the digital print section 105, and the postpress section 106, which are managed by the MIS server 202, as an exemplary software configuration. A workflow control unit 601 is a software program that operates in the MIS server 202, collects order information stored in the order server 203 or the file server 204 in a regular basis (600), and determines the procedure for processes (workflow) to carry out the order from the order information, thereby controlling and managing the workflow. The workflow control unit 601 provides work processors 602 used for performing processes required for carrying out the order with instructions to execute the processes.

The work processors 602 are work processes executed in the prepress section 104, the digital print section 105, and the postpress section 106 and indicate the respective work processes to carry out an order. A workflow editor 603 is a software program by which an administrator defines and sets a work process that is recognizable by the workflow control unit 601. A process setting file (workflow setting file) 604, which is a described later, is created by the workflow editor 603. The workflow control unit 601 controls the entire job by reading the process setting file and operating in accordance with the setting. A workflow scheduler 605 performs scheduling of the entire work process, which is described below.

Figure 6B:
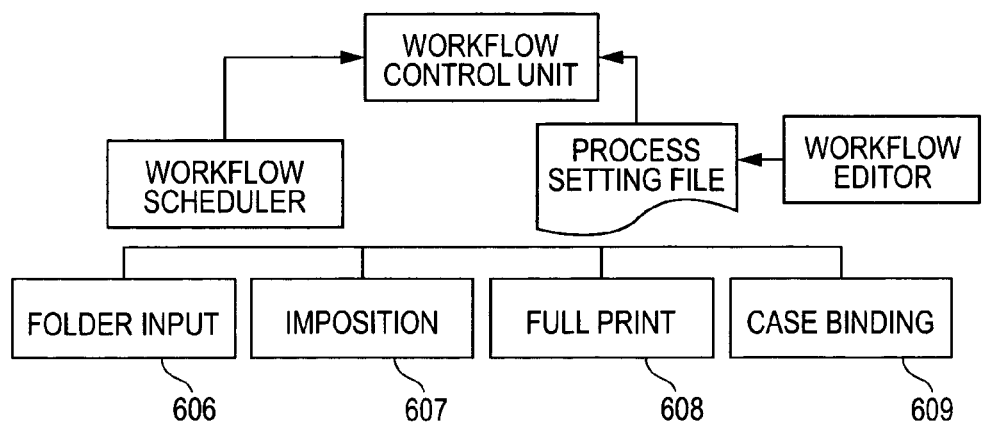

In the first exemplary embodiment, for example, in a case where a user orders a print request for a simple printing and binding service that is executed by performing imposition on input data, printing, and case binding, the workflow is represented in FIG. 6B. The work processors 602 for performing each process include a folder input process 606 for storing input data from a user in the work PC, an imposition process 607 for performing imposition on the data input in the folder input process, a print process 608 for printing the data subjected to imposition, and a case binding process 609 for performing postpress processing which serves as actual case binding processing. For the sake of simplicity, the four processes are present in the first exemplary embodiment. However, the present invention is also applicable to a structure in which further detailed processes are included.

FIG. 7A illustrates an example of the process setting file 604 in which process information is stored. A job type ID area 701 stores an ID that identifies the type of an input job, for example, "case binding", "manual printing", and the like. A process ID area 702 stores a process ID that identifies a process. An estimated operation time area 703 stores process processing time that is estimated in advance. An affiliated group ID area 704 stores an affiliated group ID that identifies a group to which each process identified in the process ID area 702 is assigned. A group ID area 705 stores a group ID serving as a group identifier. A movement attribute area 706a stores a movement attribute which indicates whether a process group shown in the group ID area 705 is movable or unmovable when the process group is to be scheduled.

For example, as shown in FIG. 6B, in a case where the job type indicates "Case Binding" and a job is composed of a folder input process, an imposition process, a print process, and a case binding process, the process setting file 604 is represented in FIG. 7B. A job type ID area 706b stores "Case-Binding Print", a process ID area 707 stores "Folder Input", a process ID area 708 stores "Imposition", a process ID area 709 stores "Print", and a process ID area 710 stores "Case Binding".

In the first exemplary embodiment, as the affiliated group ID, the folder input process and the imposition process belong to group 1 (711), whereas the print process and the case binding process belong to group 2 (712). As shown in an area 713, an unmovable attribute is set to group 1 as the movement attribute. As shown in an area 714, a movable attribute is set to group 2 as the movement attribute. In the estimated operation time area 703, one hour is set as the estimated processing time for each process.

Figure 8:
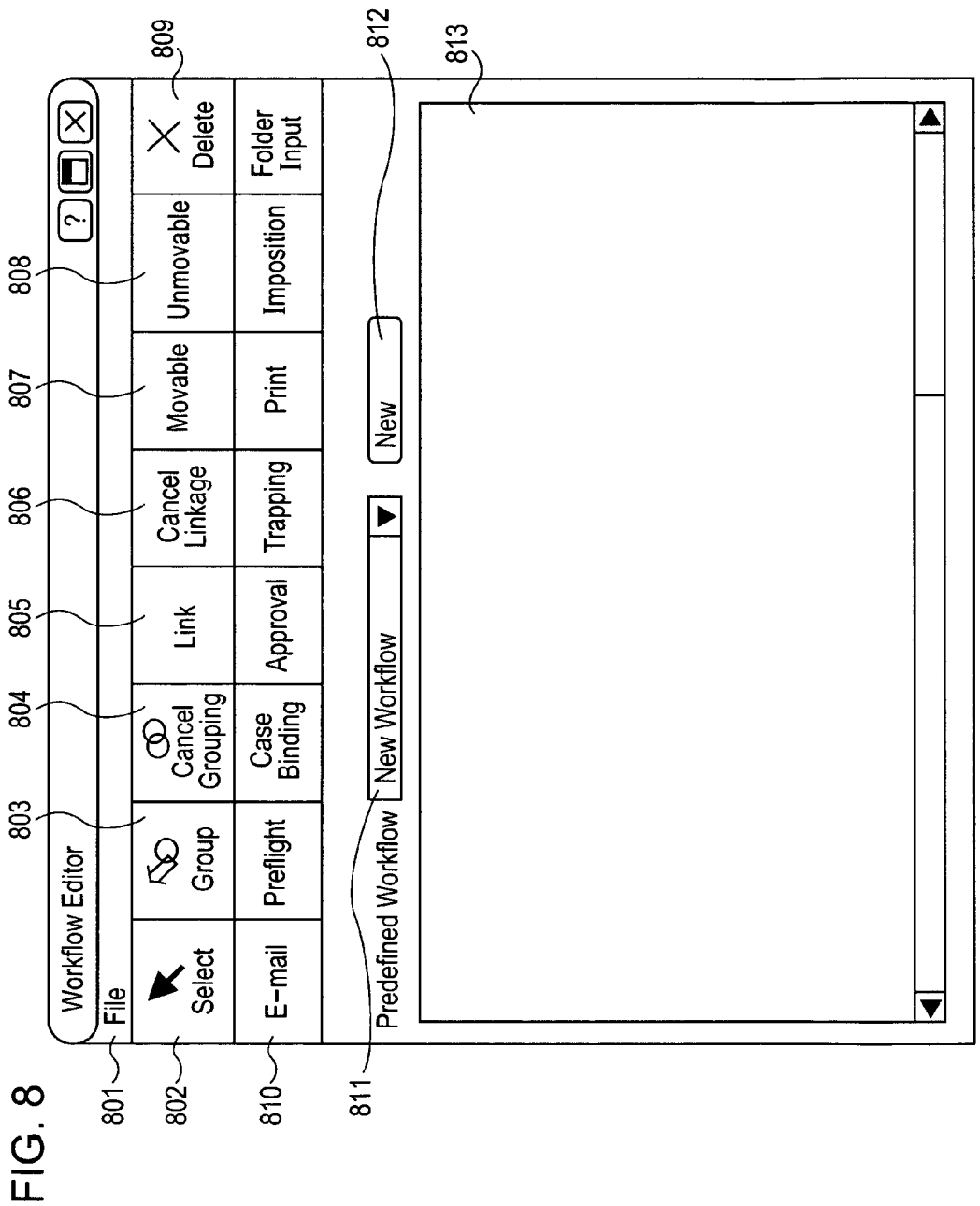
FIG. 8 illustrates an example of a user interface of the workflow editor.

FIG. 8 illustrates an example of a user interface screen of the workflow editor 603 which creates the process setting file 604. A setting screen 801 in the workflow editor 603 displays a "File" menu. If the File menu is selected, "New", "Read", and "Save" (not illustrated) are made selectable to allow a process setting file to be newly created, the existing file to be read, and the file to be saved, respectively.

Buttons for enabling editing functions in the workflow editor are arranged in the next stage 802-809. A "Select" button 802 is used to select a process object region appearing on a work area 813. A "Group" button 803 is used to group selected process objects. A "Cancel Grouping" button 804 is used to cancel grouping of processes grouped with the Group button 803. A "Link" button 805 is used to link the selected processes together. A "Cancel Linkage" button 806 is used to cancel the linkage. A "Movable" button 807 is used to set the movement attribute for a group to be movable. An "Unmovable" button 808 is used to set the movement attribute for a group to be unmovable. A "Delete" button 809 is used to delete a selected process or group.

Buttons labeled "E-mail", "Preflight", "Case Binding", "Print", "Imposition", and "Folder Input" arranged in a stage 810 indicate predetermined processes and are used to place each process in the work area 813. A workflow list box 811 lists predetermined workflows for a process setting file that is currently open. A "New" button 812 is used to add a new workflow to the currently open process setting file. The work area 813 displays a workflow that is being edited.

Figure 9:
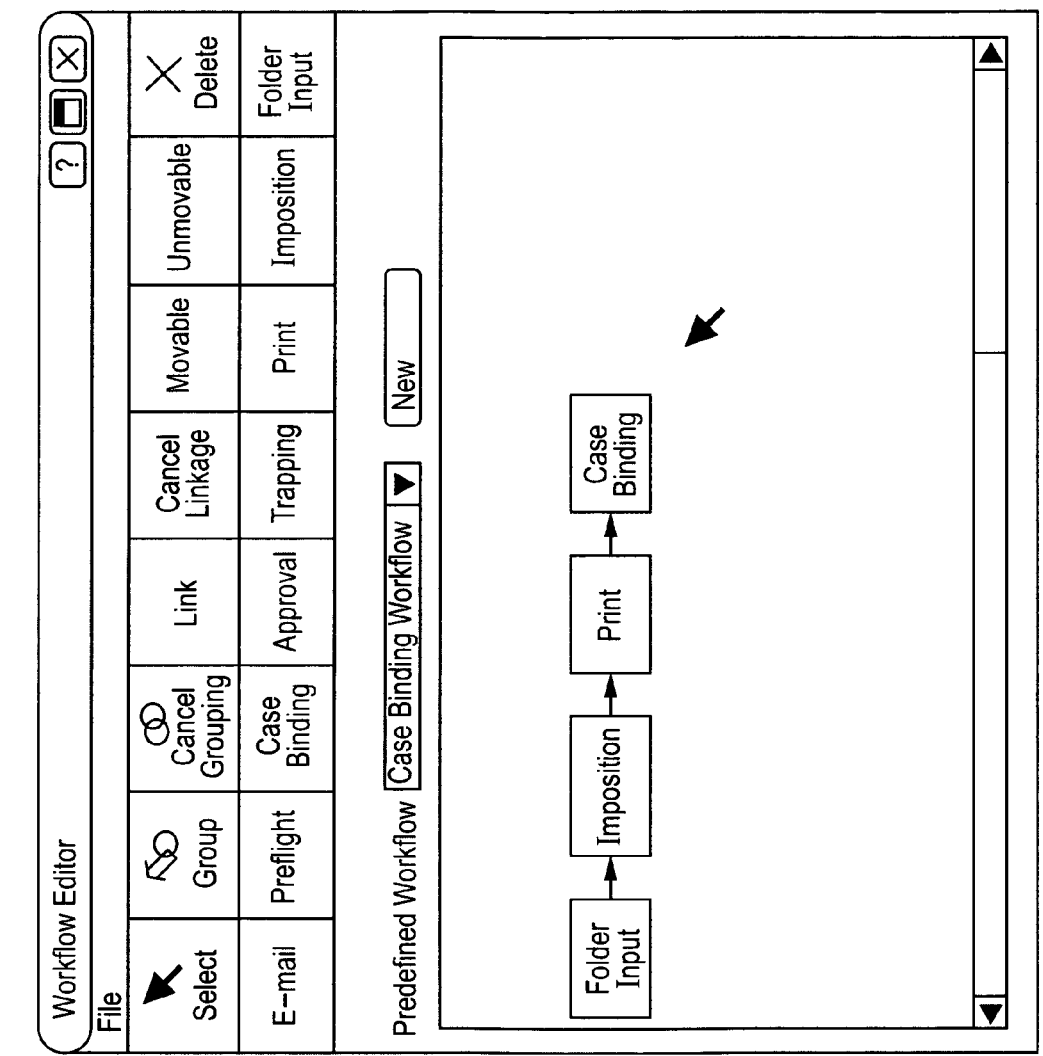
FIG. 9 illustrates an example of the user interface of the workflow editor.

In a case where an operator edits a workflow, the operator first creates a new file or causes the existing file to be read from the File menu 801 to open a process setting file. To add a new process to the work area 813, the operator selects any one of the buttons 810 indicating the predetermined processes with a pointing device and drags and drops it into the work area 813. To link two processes together, the operator selects two modules corresponding to the two processes in the work area 813 and presses the Link button. For example, FIG. 9 illustrates a case where a workflow for performing "imposition" on data subjected to the "folder input" process, a "print" process, and then "case binding" process is created.

To create this workflow, the "Folder Input" button is pressed with the pointing device and then dragged and dropped into the work area 813 to be added therein. The "Imposition" button is pressed and then dragged and dropped into the work area 813 to be added therein. The "Case Binding" button is pressed and then dragged and dropped into the work area 813 to be added therein. The Select button is pressed, the Folder Input process and the Imposition process are then selected, and the Link button is then pressed to link the selected processes together. The Imposition process and the Print process are selected, and the Link button is then pressed to link the selected processes together. The Print process and the Case Binding process are selected, and the Link button is then pressed to link the selected processes together. In this way, the workflow shown in the work area in FIG. 9 is created. Each of the predetermined workflows listed in the workflow list box 811 can be named freely.

Figure 10:
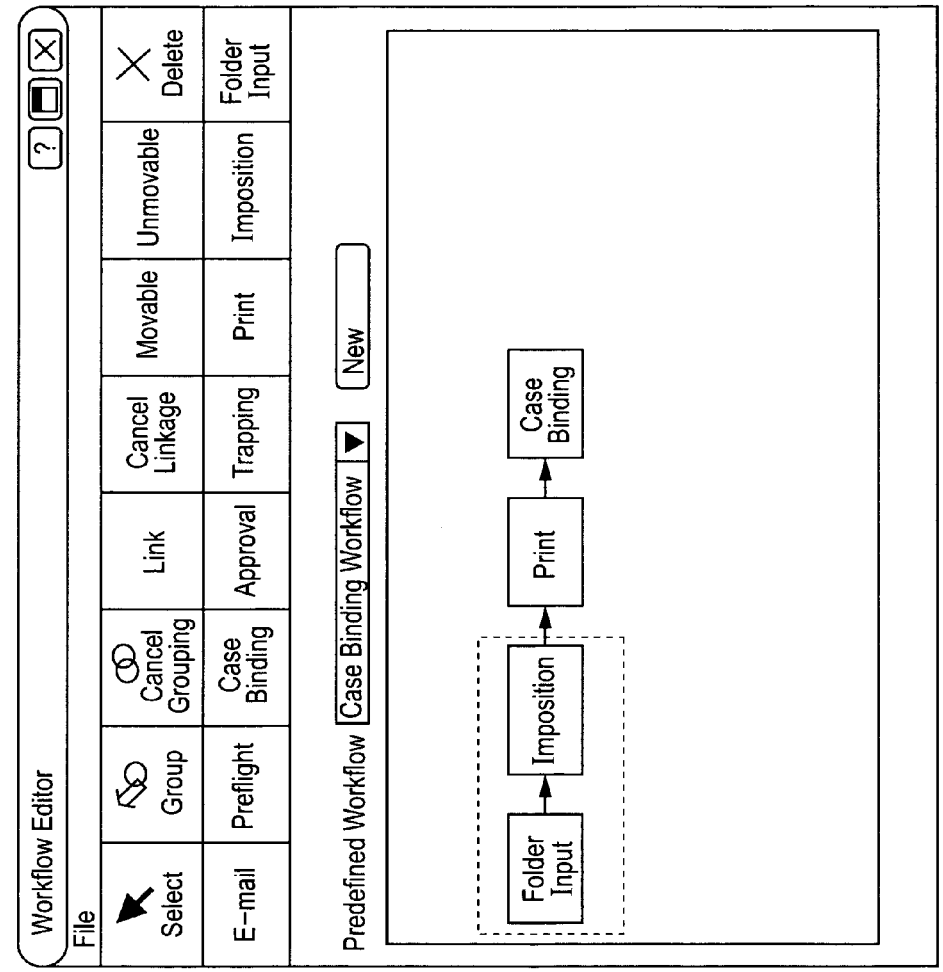
FIG. 10 illustrates an example of the user interface of the workflow editor.

Moreover, as shown in FIG. 10, by selecting the Folder Input process and the Imposition process and then pressing the Group button, the selected processes are grouped. As shown in FIG. 10, a group of the grouped processes is recognized on the user interface (surrounded with a dotted line in FIG. 10). The grouped processes are scheduled so as to be continuously executed without exception.

Figure 11:
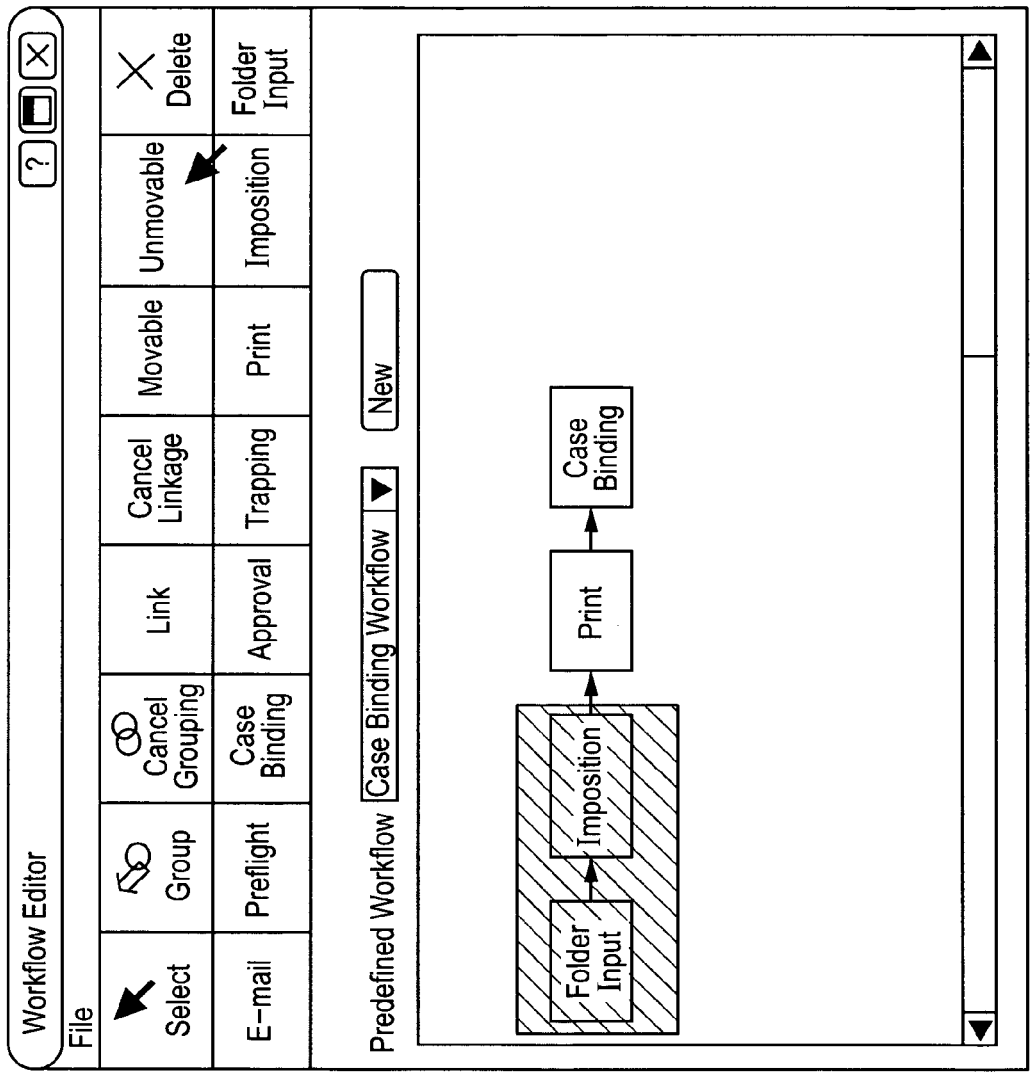
FIG. 11 illustrates an example of the user interface of the workflow editor.

Furthermore, in the workflow editor, as shown in FIG. 11, by selecting the Folder Input process or the Imposition process and then pressing the Unmovable button, the unmovable attribute is set to the group. Similarly, by pressing the Movable button, the movable attribute is set to, the group. In FIG. 11, the group with the unmovable attribute is shaded, thus allowing the unmovable attribute to be recognized.

Figure 12:
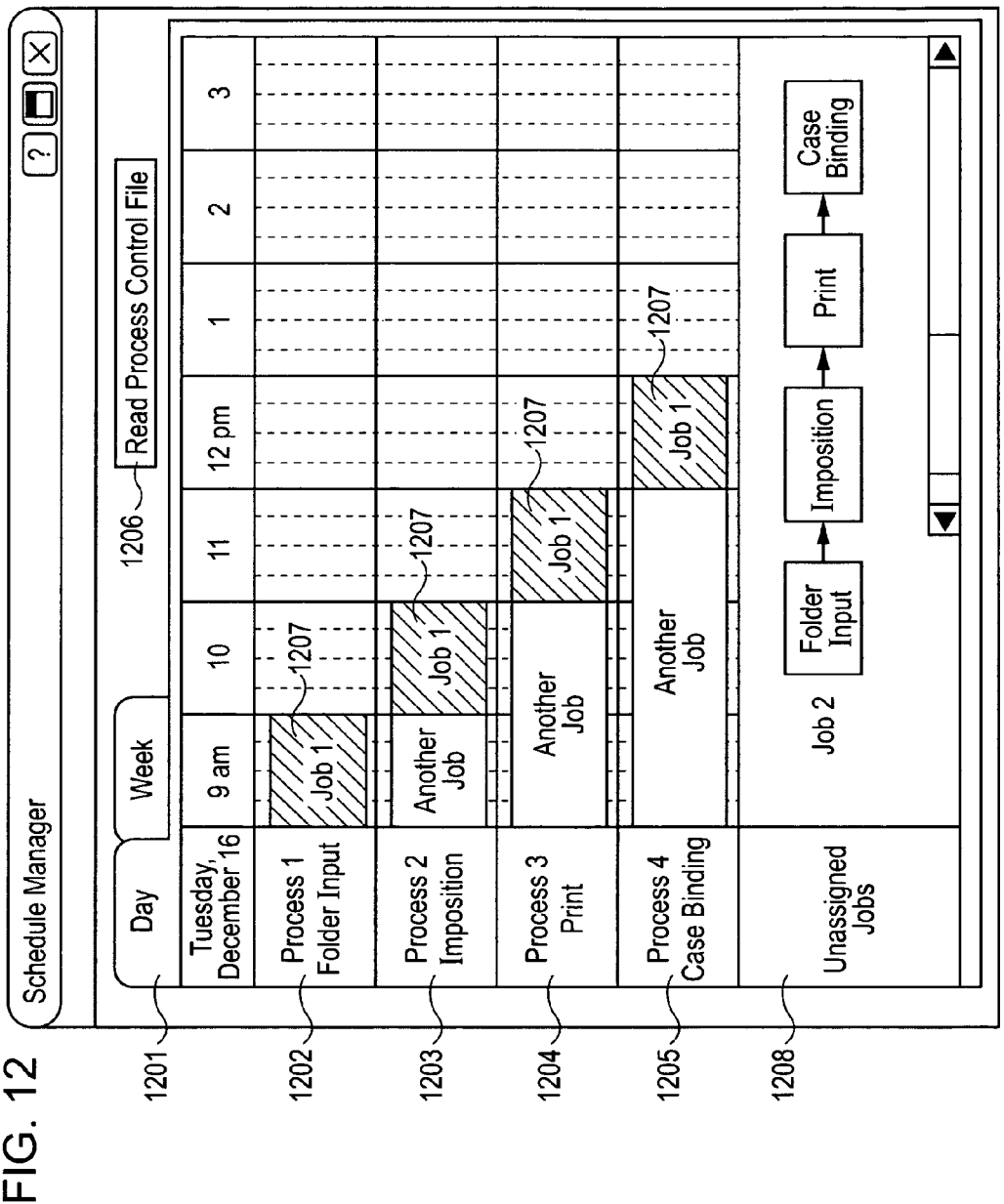
FIG. 12 illustrates an example of a user interface of a workflow scheduler.

FIG. 12 illustrates an example of a screen layout (user interface) of the workflow scheduler 605 (of FIG. 6A). In FIG. 12, selecting a Day tab 1201 allows a user to view a schedule for processes on a daily basis. The schedule may be displayed on any time basis, for example, a weekly or yearly basis.

The processes constituting an input job is displayed in areas 1202 to 1205. The Folder Input process serving as a first process is shown in an area 1202. The Imposition process serving as a second process is shown in an area 1203. The Print process serving as a third process is shown in an area 1204. The Case Binding process serving as a fourth process is shown in an area 1205. Although the name of a process is displayed on each of the areas 1202 to 1205 in the first exemplary embodiment, a schedule for an operator who actually handles the process or a schedule for a device that actually performs the process may be displayed as long as the displayed subject allows the process to be recognized.

A "Read Process Setting File" button 1206 is used to read the process setting file 604 created in the workflow editor 603. By pressing this button, a user interface for specifying a file (not illustrated) is displayed, so that the process setting file 604 can be read. The workflow scheduler 605 displays each process on the basis of information in the process setting file 604 read by pressing this button and operates.

A Job 1 schedule 1207 is scheduled on the basis of the estimated processing time for each process described in the workflow setting file and composed of Process 1 (1202), Process 2 (1203), Process 3 (1204), and Process 4 (1205). An unassigned job area 1208 is used to display a job that temporarily escapes when scheduling the job is impossible. The unassigned job area 1208 is temporarily employed in a case where a job would not meet the delivery time when each process in the job is arranged.

Figure 13:
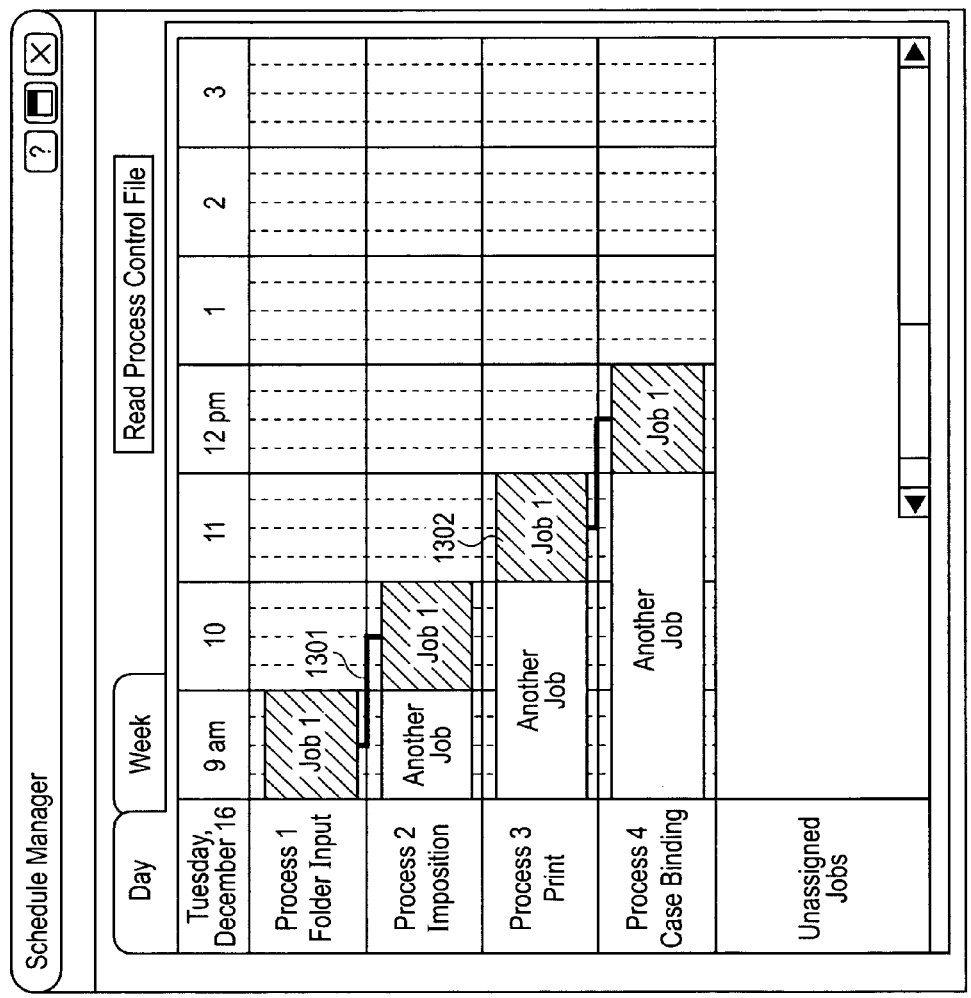
FIG. 13 illustrates an example of the user interface of the workflow scheduler.

As shown in FIG. 13, the exemplary workflow scheduler 605 reads the affiliated group ID area 704 and the movement attribute area 706a set in the process setting file 604 and displays the read information on the user interface in a recognizable manner. In FIG. 13, Process 1 and Process 2 are displayed so as to be linked with each other, as indicated with reference numeral 1301, thus allowing grouping of these two processes to be displayed in a recognizable manner. Process 3 and process 4 are displayed in such a way that a group frame is indicated by a heavy line, as indicated with reference numeral 1302, thus displaying a state in which a group of Process 3 and Process 4 is movable in a recognizable manner.

Figure 14:
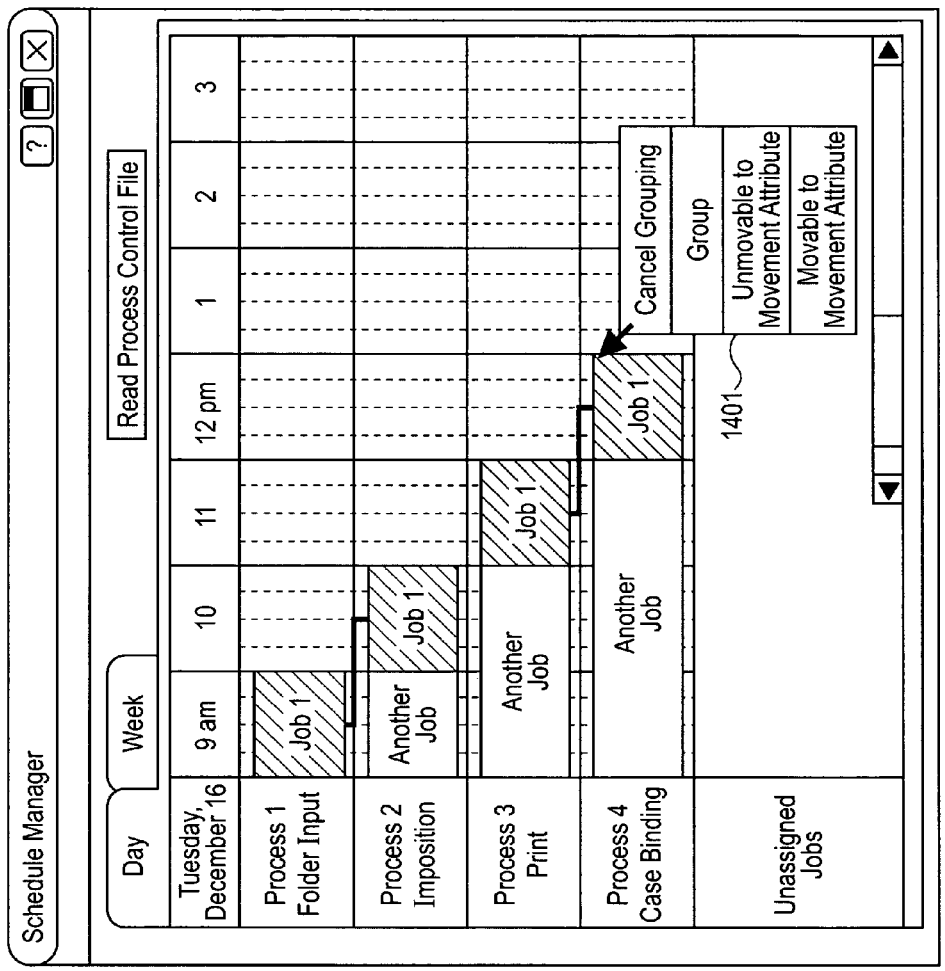
FIG. 14 illustrates an example of the user interface of the workflow scheduler.

As shown in FIG. 14, the workflow scheduler 605 can change the grouping attribute and the movement attribute read from the process setting file 604 on the screen of the workflow scheduler 605. In FIG. 14, a popup menu 1401 is displayed by selecting a group with the pointing device and then right-clicking on. Selecting a desired attribute in the popup menu 1401 changes the corresponding attribute on the workflow scheduler 605.

Figure 15A:
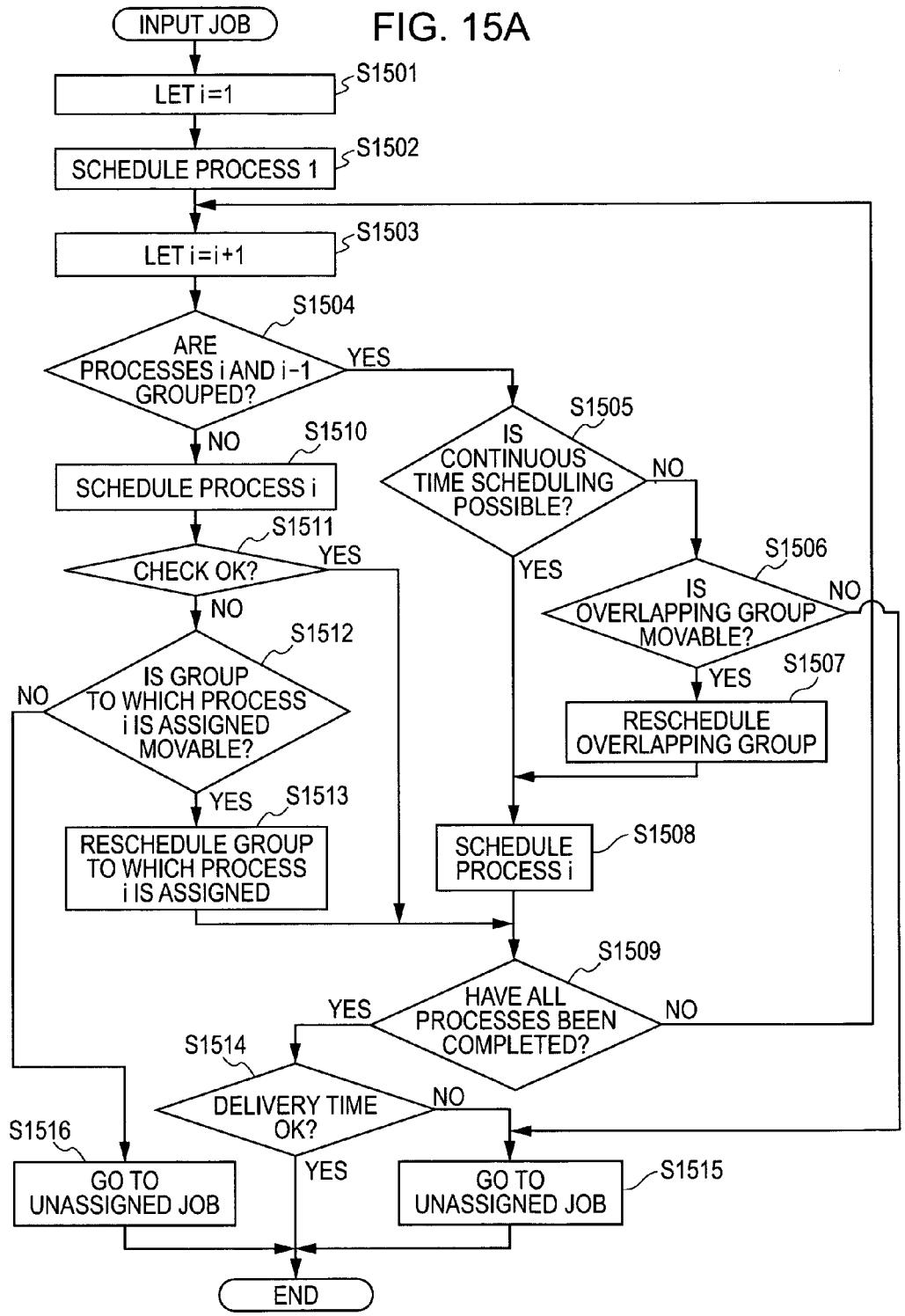
FIGS. 15A and 15B are flowcharts of exemplary scheduling in the workflow scheduler.

FIG. 15A is a flowchart of processing occurring in scheduling in the workflow scheduler 605. In the first exemplary embodiment, when a job is input, a process identifier i for identifying a process is initialized to one (step S1501). In step S1502, Process 1 is scheduled. Process 1 is usually scheduled at the earliest time slot in time to which Process 1 is assignable at the present time. The estimated processing time is estimated in advance in the process setting file for each step on the basis of experience of an operator, the speed of a printer, the work load, and the like.

In step S1503, the process identifier i is incremented (by one in the first exemplary embodiment) to assign the next process, and processing then proceeds to step S1504. In step S1504, it is determined by reading the process setting file whether Process i and Process i-1 are grouped. If the both processes are grouped, processing then proceeds to step S1505. In step S1505, it is determined whether Process i and Process i-1 can be scheduled so as to be continuously executed. If, in step S1505, both processes can be assigned so as to continuously executable, Process i and Process i-1 are scheduled so as to be continuously executed in step S1508.

If, in step S1505, both processes cannot be assigned so as to be continuously executed, it is determined in step S1506 whether an overlapping group, to which an overlapping process that has existed (a process that overlaps the process that is being scheduled) is assigned, is movable. If, in step S1506, the overlapping group is movable, the overlapping group is rescheduled in step S1507, and then Process i is scheduled in step S1508.

If, in step S1504, Process i and Process i-1 are not assigned in the same group (not grouped), processing then proceeds to step S1510 which schedules Process i. In this case, Process i is scheduled at the earliest time slot in time to which Process i is assignable at the present time. In step S1511, it is determined whether the set schedule of Process i is appropriate. The determination procedure as to the appropriateness of the schedule is shown in the flowchart of FIG. 15B, which is described later.

If, in step S1511, the set schedule of Process i is appropriate, it is determined in step S1509 whether all processes have been assigned. If, in step S1509, assignment of all processes has been completed, processing then proceeds to step S1514. If, in step S1509, a process to be scheduled remains, processing proceeds to step S1503 which assigns the next process.

If, in step S1511, the schedule of Process i is inappropriate, it is determined in step S1512 whether a group to which Process i is assigned is movable. If, in step S1512, the group to which Process i is assigned is movable, this group is rescheduled in step S1513, and Process i is assigned. If, in step S1512, the group is unmovable, the job is displayed in the unassigned job area in step S1516. If, in step S1506, the overlapping process, which overlaps Process i, cannot be moved, the job is displayed in the unassigned job area in step S1515. After steps S1514, S1515 and S1516, the process ends.

Figure 15B:
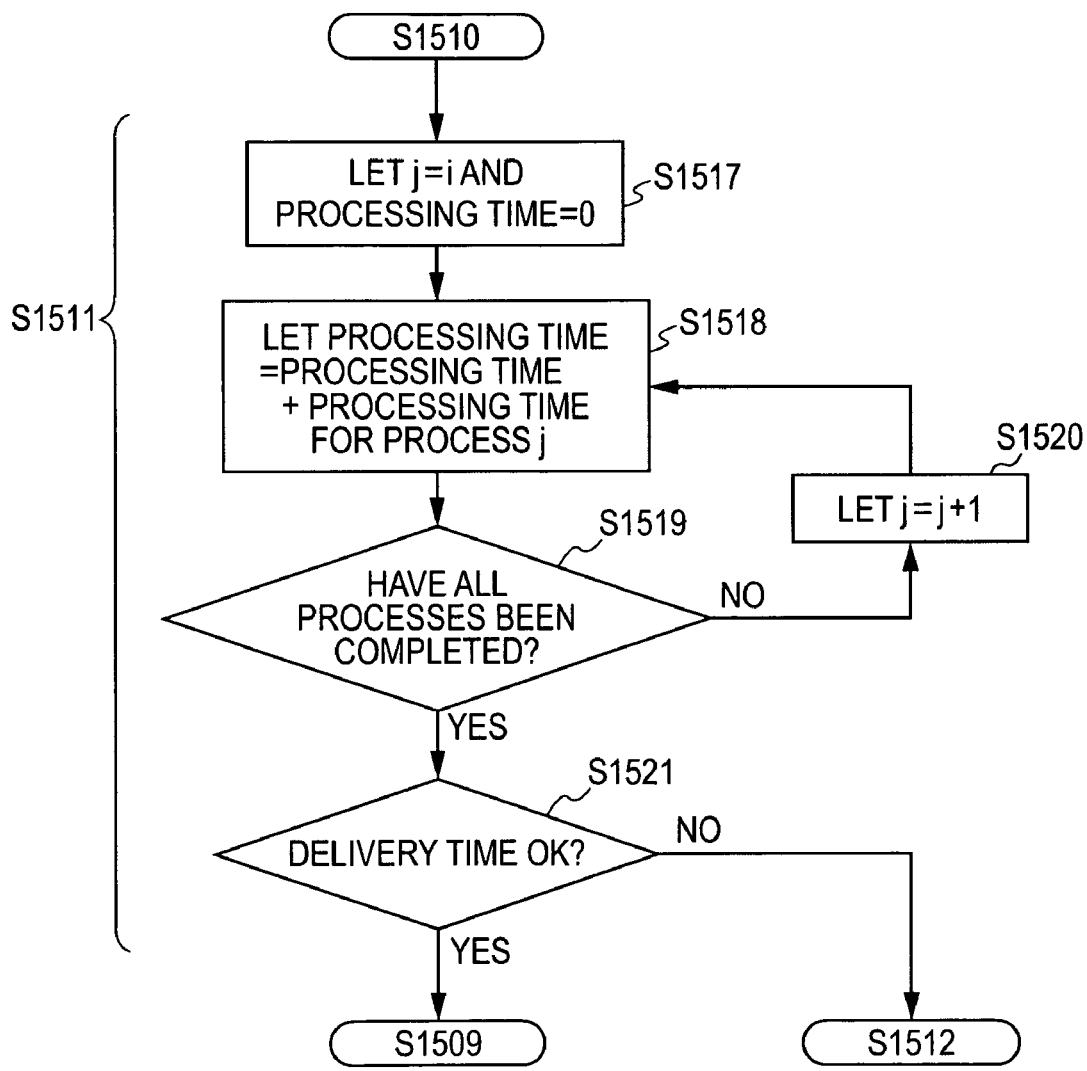

FIG. 15B is a flowchart of the detailed procedure of the determination in step S1511 shown in FIG. 15A. In step S1517, the identifier i in the current process is substituted into an identifier j. In step S1518, processing time (estimated operation time) for Process j is added to the estimated operation time. In step S1519, it is determined whether the addition calculation has been performed on all processes. If, in step S1519, a process to be calculated remains, the identifier j is incremented (by one) in step S1520. As a result, the sum of the estimated operation times in all processes after Process i is calculated, and processing then proceeds to step S1521. In step S1521, it is determined whether estimated operation time (equal to estimated operation time for the remaining processes) does not delay the delivery time. If, in step S1521, the delivery time would be delayed, the processing proceeds to step S1509. If, in step S1521, the delivery time would not be delayed, the processing then proceeds to step S1512.

Figure 16:
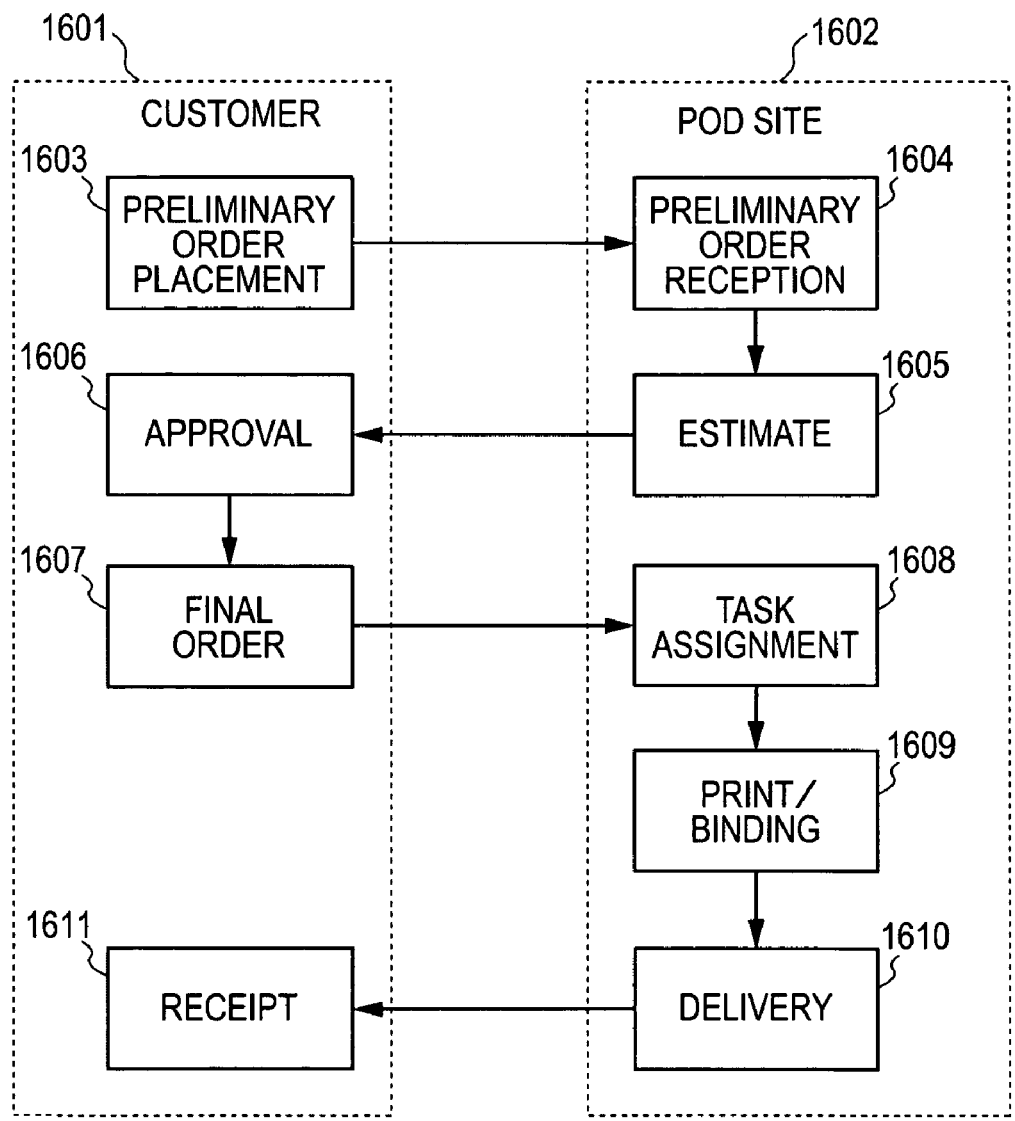
FIG. 16 illustrates an example of a document input sequence according to the first exemplary embodiment.

FIG. 16 illustrates an exemplary procedure from job ordering from an end user according to the first exemplary embodiment. A customer block 1601 indicates actions performed by a customer, which is the end user. A POD block 1602 indicates actions performed by an operator at a POD site.

The customer uses a web page on the Internet and places a preliminary order with the order server 203 at the POD site (1603). For example, in the case of a case-binding print order, a user authentication is performed from the client PC in the end user environment 101, and print condition settings, which specify print conditions to be output, and other print request information are then input. The customer sends a document/image file that serves as a print subject as electronic data together with the print condition settings and other print request information from the client PC in the end user environment 101 to the order server 203. In this way, the customer places the preliminary print job order with the MIS server 202 functioning as a web server.

The POD site performs processing for receiving and storing the job with respect to the received preliminary order (1604) and forms an estimate of the cost of the job. The total cost is calculated in consideration of the print conditions input from the customer at the placement of the preliminary order on the basis of an estimate of expenses for tasks and resources required for the job, a delivery charge, and other overhead costs, and the estimated price is provided to the customer (1605). The customer that receives the estimated price obtains approval from a manager (1606), and then places a firm order with the order server 203 at the POD site (1607). The job print conditions or copy conditions set at the preliminary order can be changed at this firm order placement.

When the order server 203 at the POD site receives the firm order from the customer, task assignment is performed by using the process control system according to the first exemplary embodiment (1608), and various kinds of processing regarding printing/binding for the job are performed through each process in the prepress, digital print, and postpress processing (1609). When the various kinds of processing regarding printing/binding at the POD site have been completed, a final product (printed matter) is delivered to a destination specified by the customer in advance (1610). The customer then receives the final product (printed matter) (1611).

Figure 17:
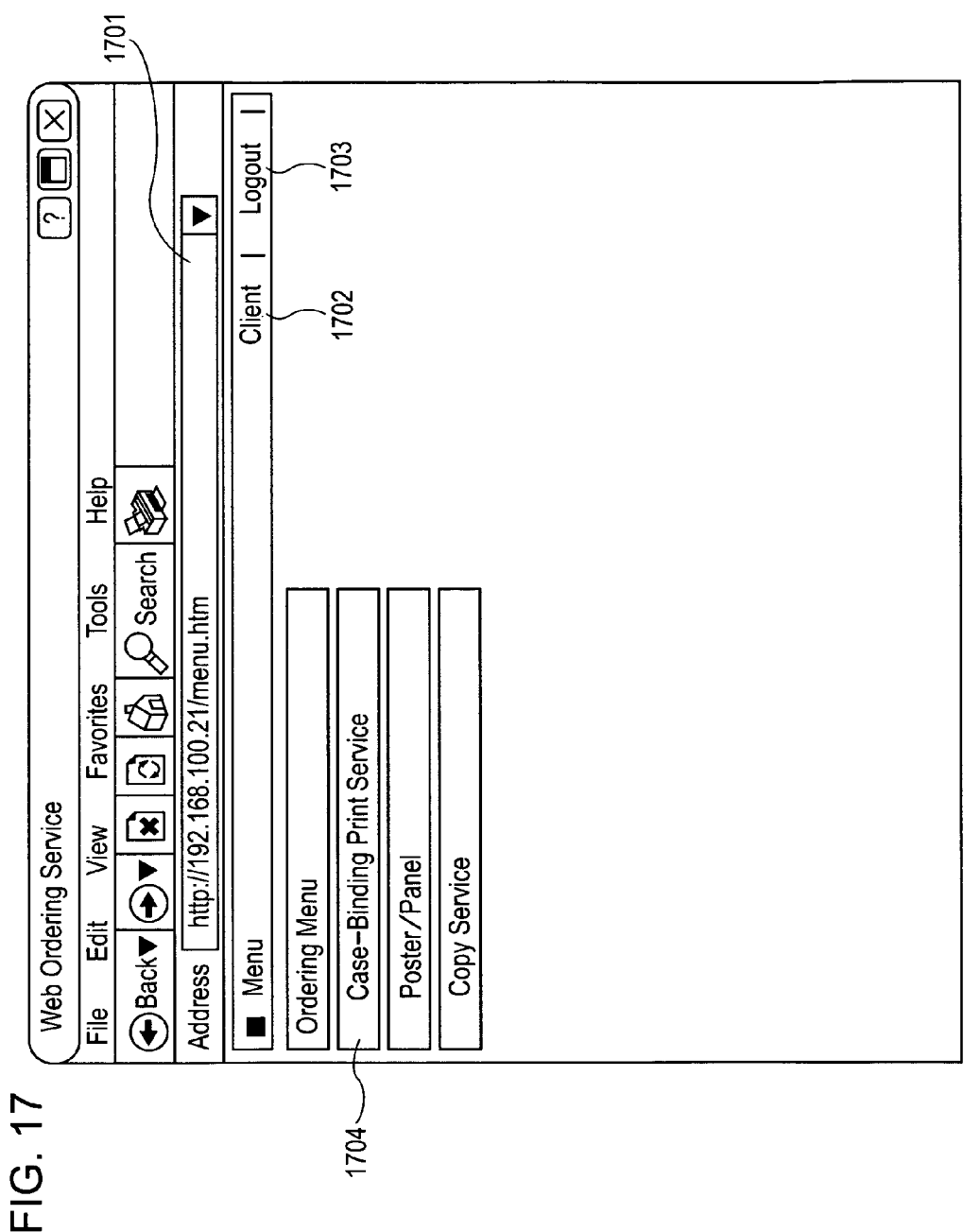
FIG. 17 illustrates an example of a screen appearing when a document is input according to the first exemplary embodiment.

As one unit for receiving a job from the client PC in the end user environment 101 to the order server 203 via a communication medium, such as the Internet, an order management application is used. FIG. 17 illustrates an example of a menu screen for job ordering.

The menu screen in the order management application shown in FIG. 17 is a front page of the screen appearing when a customer logs in to the order management application to place an order from the client PC in the end user environment 101 via a communication medium, such as the Internet. In the Figures, an exemplary Internet Protocol (IP) address 192.168.100.21 is used in a uniform resource locator (URL) address 1701 in a web browser. In the case of an environment that supports the domain name system (DNS), which provides a service that maps the names of host computers to their respective IP numbers on a TCP/IP network, such as the Internet, the name of the order server can be input instead of the IP address.

At the upper portion of the menu screen in the order management application, a client name identified by a login name is displayed in a "Client" 1702 and a "Logout" button 1703 used for logging out from the order management application. An "Ordering Menu" includes the following menu buttons: a "Case-Binding Print Service" button 1704 for a service that prints a document from electronic data and performs case binding; a "Poster/Panel" button for a service that prints a poster or the like from electronic data and performs panel processing; and a "Copy Service" button for a service that makes a copy of document sheet and performs binding processing.

Figure 18:
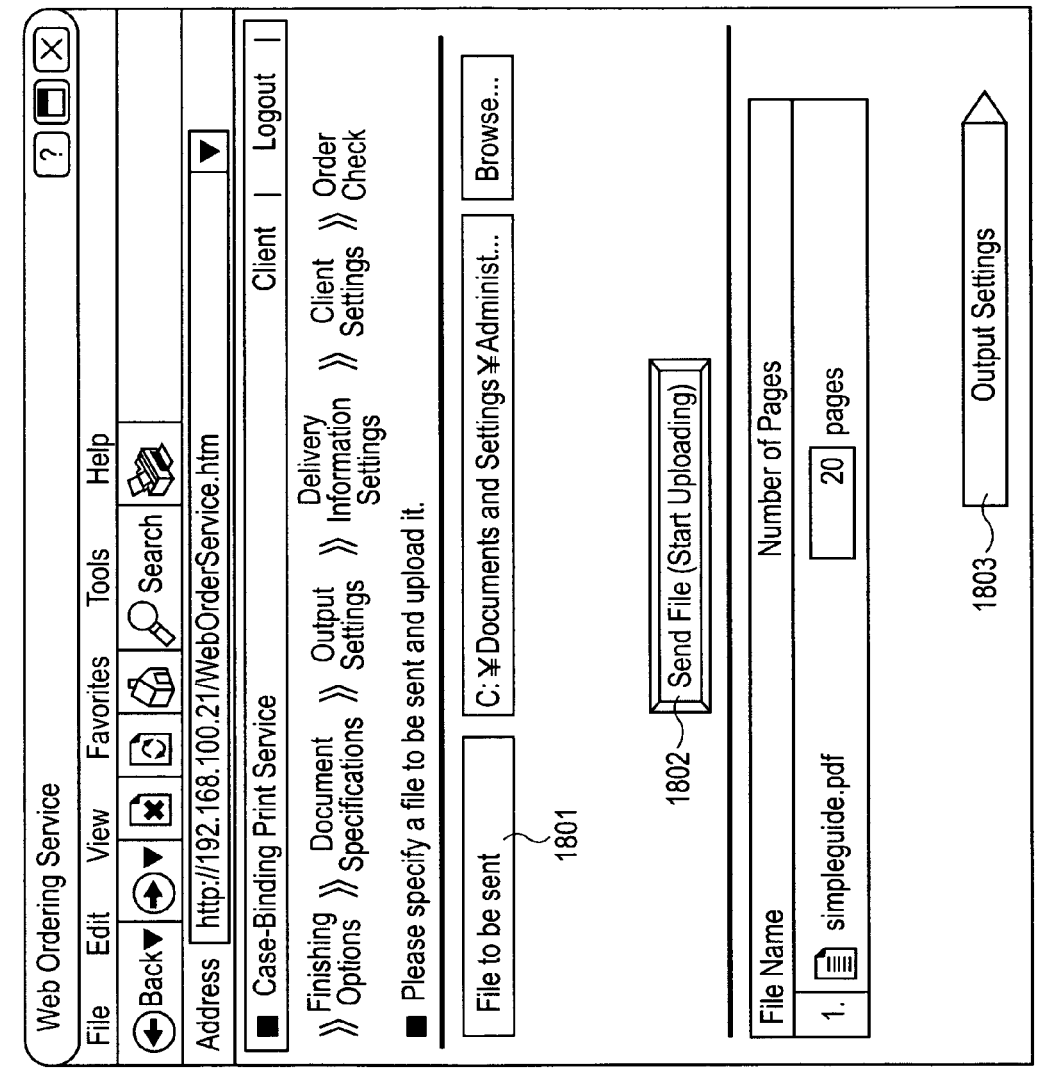
FIG. 18 illustrates an example of a screen appearing when input document settings are specified according to the first exemplary embodiment.

FIG. 18 illustrates an example of a screen appearing when the "Case-Binding Print Service" button 1704 is pressed. A file to be sent is specified in a box 1801. When a "Send File" (Start Uploading) button 1802 is pressed, the file is sent and input to the system. Pressing an "Output Settings" button 1803 displays a user setting screen shown in FIG. 19, thus allowing various settings, such as binding, to be specified.

Figure 20:
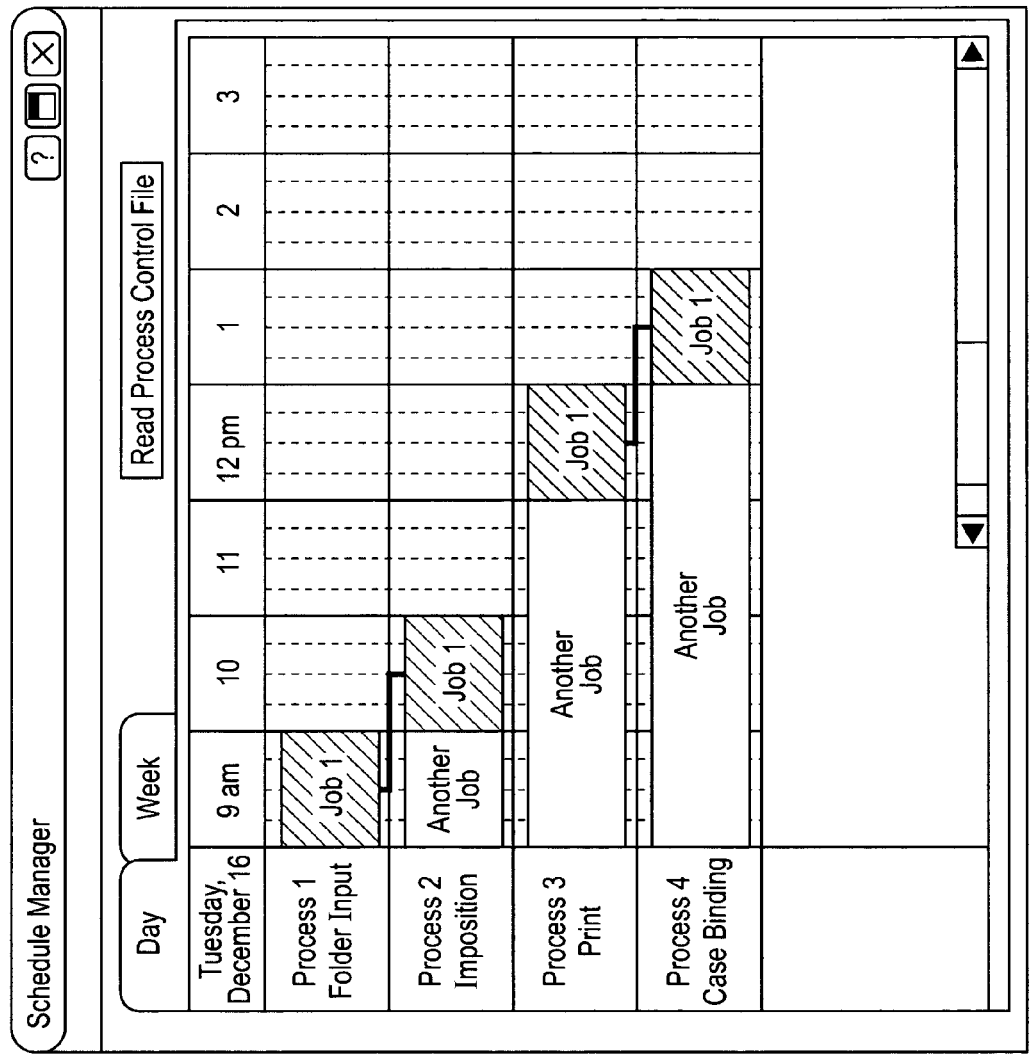
FIG. 20 illustrates an example of the user interface of the workflow scheduler according to the first exemplary embodiment.

In the first exemplary embodiment, an administrator of the POD site uses the workflow editor, and a service that has a process setting file shown in FIG. 7B is provided. In the current schedule, as shown in FIG. 20, all processes in Job 1 have been scheduled in such a way that Process 1 is assigned to 9 a.m. to 10 a.m., Process 2 is assigned to 10 a.m. to 11 a.m., Process 3 is assigned to 12 p.m. to 1 p.m., and Process 4 is assigned to 1 p.m. to 2 p.m. As shown in FIG. 7B, Processes 1 ("Folder Input" process) and 2 ("Imposition" process) are grouped and Processes 3 ("Print" process) and 4 ("Case Binding" process) are grouped. The grouping of Processes 3 and 4 has a movable attribute.

In this state, a procedure of scheduling Job 2 having the same Job type ID (case-binding print) as that of Job 2 is described below with reference to the flowcharts of FIGS. 15A and 15B. In this case, the delivery time for Job 1 is 3 p.m. and that for Job 2 is 2 p.m. Additionally, as shown in FIG. 7B, the estimated operation time for each process is one hour.

When Job 2 is input, a process identifier i for identifying a process is initialized to one (step S1501). In step S1502, Process 1 (Folder Input process) is scheduled. Process 1 is scheduled at the earliest time slot in time to which Process 1 is assignable at the present time. In other words, the Folder Input process serving as Process 1 in Job 2 is assigned immediately after Process 1 in Job 1, i.e., to 10 a.m. to 11 a.m.

In step S1503, the process identifier i is incremented to assign the next process, and processing then proceeds to step S1504. In step S1504, it is determined by reading the process setting file whether Process i and Process i-1 are grouped. In this case, since Process 2 (Imposition process) and Process 1

(Folder Input process) are grouped, processing then proceeds to step S1505. In step S1505, it is determined whether Process 2 and Process 1, which is previous process, can be scheduled so as to be continuously executed. In this case, since Process 1 and Process 2 can be scheduled so as to be continuously executed, Process 2 is scheduled so as to be connected to Process 1. As shown in the Figure, according to the first exemplary embodiment, Process 2 can be assigned so as to be continuously executed. Therefore, Process 2 in Job 2 is assigned immediately after Process 2 in Job 1, i.e., to 11 a.m. to 12 p.m.

In step S1509, it is determined that a process to be scheduled remains, the process identifier i is incremented in step S1503 and the next process, Process 3, is scheduled. In step S1504, since Process 3 and Process 2 are not in the same group, processing proceeds to step S1510. In step S1510, Process 3 is assigned to the time next to Process 3 in Job 1, i.e., 1 p.m. to 2 p.m., and processing then proceeds to step S1511 which determines whether the schedule is appropriate.

In step S1517, the remaining processing time for Processes 3 and 4 is calculated in steps S1517 to S1520. In step S1521, the estimated remaining operation time is two hours. Since Process 3 is assigned to 1 p.m. to 2 p.m., Job 2 is scheduled to end at 3 p.m. Since this end time is one hour overdue, the schedule is determined to be inappropriate in step S1521, and processing then proceeds to step S1512.

In step S1512, it is determined whether a group to which Process 3 is assigned is movable. Since the determination in step 1512 shows that Process 3 in Job 1 is movable, Process 3 in Job 1 is rescheduled in step S1513 to schedule Process 3 in Job 2. In step S1513, Process 4 in Job 1, which is in the same group as that in Process 3, is rescheduled together. In step S1512, it is determined whether rescheduling of Processes 3 and 4 does not delay the delivery time for Job 1 (3 p.m.). Since the rescheduled time for Processes 3 and 4 does not delay the delivery time, it is determined that Processes 3 and 4 are movable.

Figure 21:
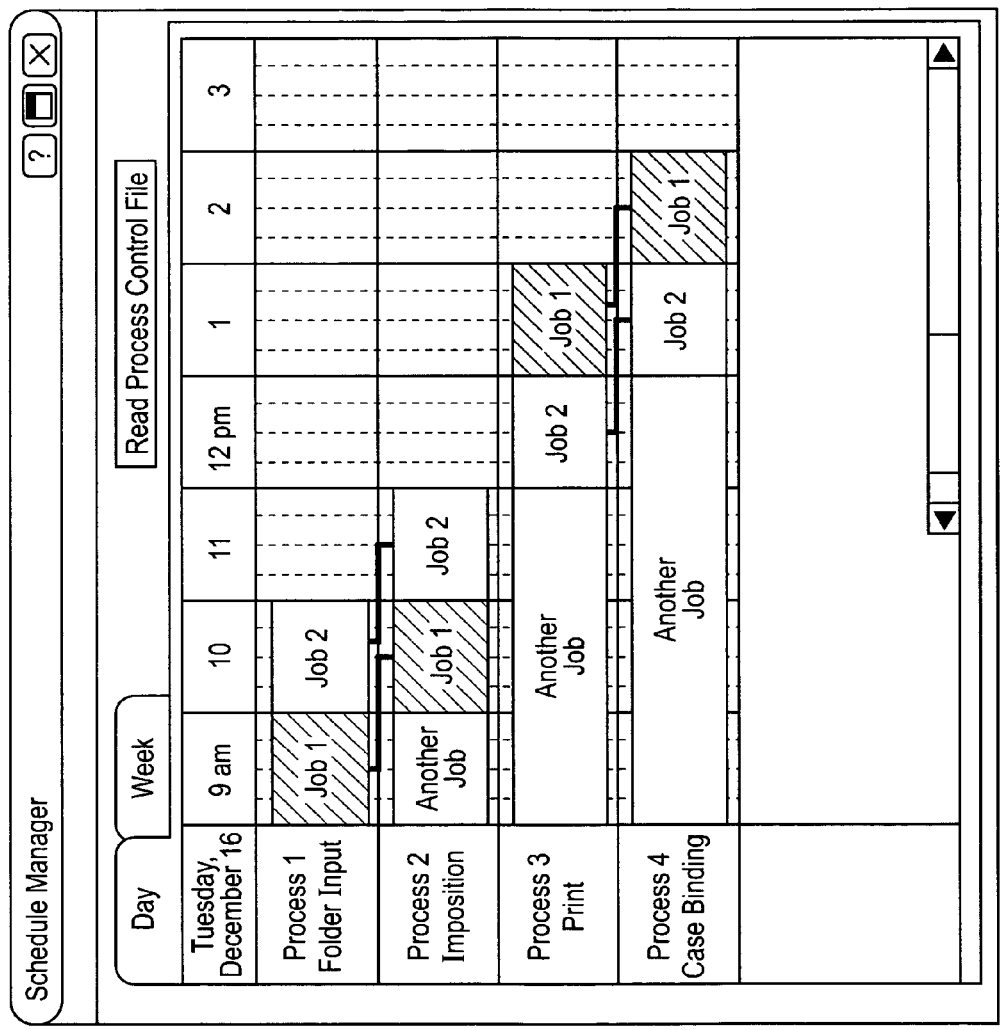
FIG. 21 illustrates an example of the user interface of the workflow scheduler according to the first exemplary embodiment.

As a result, Process 3 in Job 2 is assigned to 12 p.m. to 1 p.m., to which Process 3 in Job 2 was assigned. In step S1509, since scheduling of Process 4 remains, processing proceeds to step S1503 and then step S1504. In step S1504, since Process 4 and Process 3 are grouped, processing proceeds to step S1505. In step S1505, it is determined whether Processes 3 and 4 can be scheduled so as to be continuously executed. Since Process 4 in Job 1, which has a movable attribute, has been moved from 1 p.m. to 2 p.m., Process 4 in Job 2 is assigned to 1 p.m. to 2 p.m. in step S1508. As a result, after this scheduling procedure is complete, Jobs 1 and 2 are scheduled, as shown in FIG. 21.

Second Exemplary Embodiment

Figure 22:
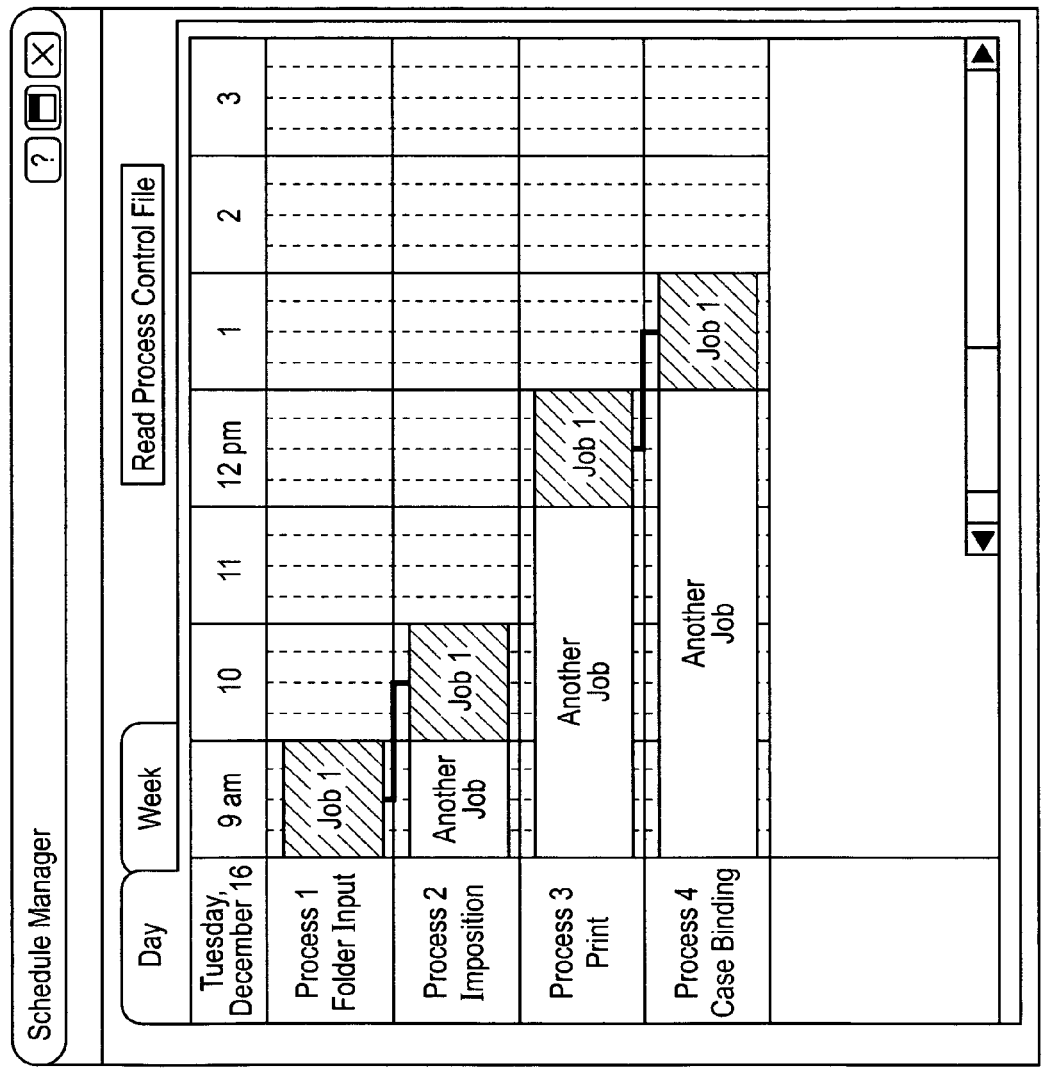
FIG. 22 illustrates an example of the user interface of the workflow scheduler according to a second exemplary embodiment.

A second exemplary embodiment of the present invention is now herein described. It is noted that only the differences between the first and second exemplary embodiments are described below. In the second exemplary embodiment, a schedule before Job 2 is input is shown in FIG. 22. The main difference between the second exemplary embodiment of FIG. 22 and the first exemplary embodiment is that Processes 3 and 4 in Job 1 in FIG. 22 have an unmovable attribute in place of a movable attribute. In the second exemplary embodiment, a procedure of scheduling Job 2 is described below with reference to the flowcharts of FIGS. 15A and 15B, as in the first exemplary embodiment.

When Job 2 is input, a process identifier i for identifying a process by using an ordinal number is initialized to one (step S1501). In step S1502, Process 1 (Folder Input process) is scheduled. Process 1 is scheduled at the earliest time slot in time to which Process 1 is assignable at the present time. In other words, the Folder Input process serving as Process 1 in Job 2 is assigned immediately after Process 1 in Job 1, i.e., to 10 a.m. to 11 a.m.

In step S1503, the process identifier i is incremented to assign the next process, and processing then proceeds to step S1504. In step S1504, it is determined by reading the process setting file whether Process i and Process i-1 are grouped. In this case, since Process 2 (Imposition process) and Process 1 (Folder Input process) are grouped, processing then proceeds to step S1505. In step S1505, it is determined whether Process 2 and Process 1, which is previous process, can be scheduled so as to be continuously executed. In this case, since Process 1 and Process 2 can be scheduled so as to be continuously executed, Process 2 is assigned immediately after Process 2 in Job 1, i.e., to 11 a.m. to 12 p.m. (step S1508).

Processing proceeds to step S1509 and then step S1503. In step S1503, the process identifier i is incremented. In step S1504, it is determined whether Process 3 and Process 2 are in the same group. Since Process 3 and Process 2 are not in the same group, processing then proceeds to step S1510. In step S1510, Process 3 is assigned to the time next to Process 3 in Job 1, i.e., 1 p.m. to 2 p.m., and processing then proceeds to step S1511 which determines whether the schedule is appropriate.

In step S1517, the remaining processing time for Processes 3 and 4 is calculated in steps S1517 to S1519. In step S1521, the estimated remaining operation time is two hours. Since Process 3 is assigned to 1 p.m. to 2 p.m., Job 2 is scheduled to end at 3 p.m. Since this end time is one hour overdue, the schedule is determined to be inappropriate in step S1521, and processing then proceeds to step S1512. The determination in step S1512 shows that Process 3 in Job 1 is unmovable. Therefore, Job 2 is moved to and displayed in the unassigned job area in step S1516.

Figure 23:
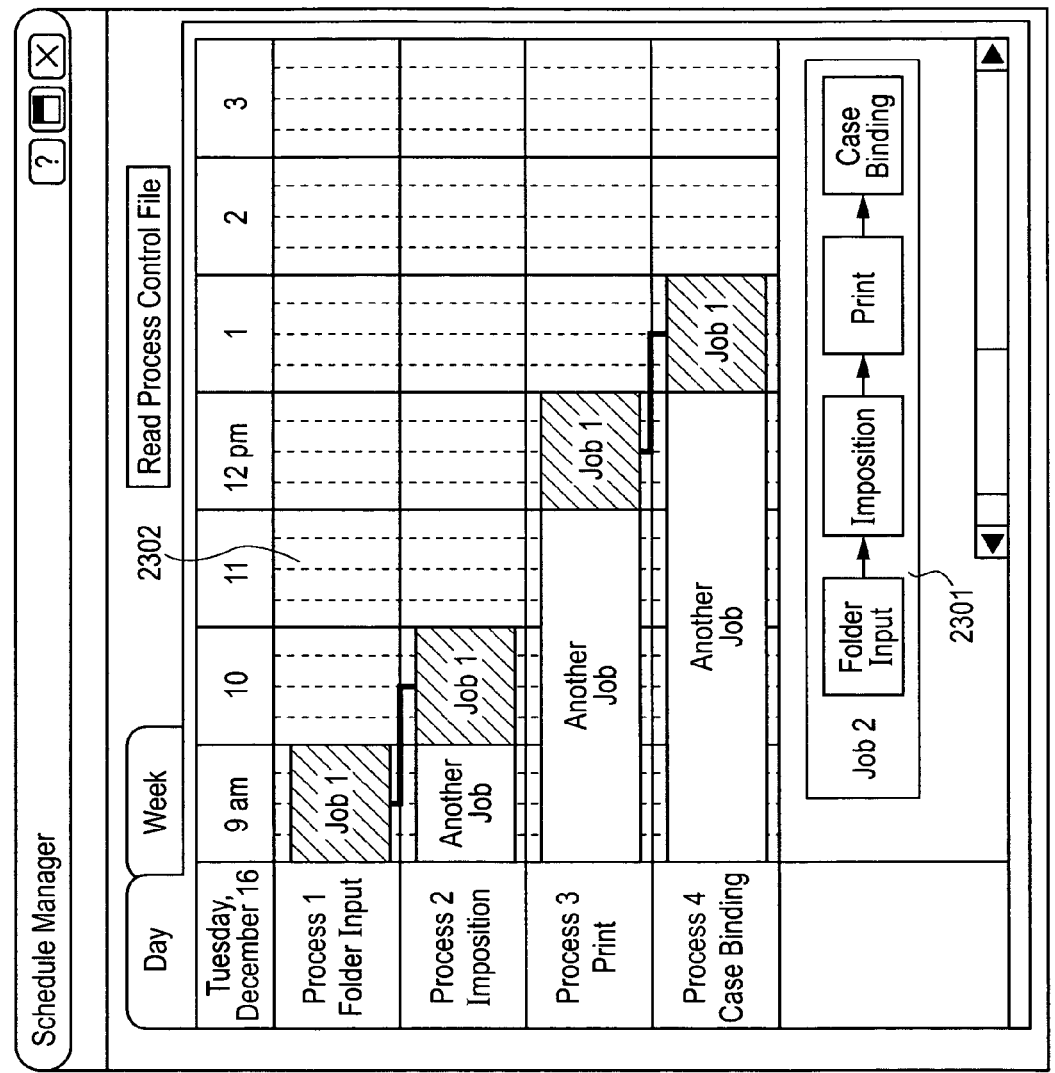
FIG. 23 illustrates an example of the user interface of the workflow scheduler according to the second exemplary embodiment.

FIG. 23 illustrates an exemplary screen appearing in this time. Job 2 is displayed as an unassigned job 2301. In the second exemplary embodiment, an administrator of the workflow can change the schedule of Processes 3 and 4 in Job 1 to be movable by selecting Processes 3 and 4 and then adding the movable attribute thereto, as shown in FIG. 14. Therefore, the administrator can perform scheduling as in the first exemplary embodiment by selecting the unassigned job 2301 and then moving the unassigned job 2301 to a schedule area 2302. As a result, scheduling is performed as in FIG. 21. Therefore, both Job 1 and Job 2 can be complete by the respective delivery times.

Other Exemplary Embodiments, Features and Aspects of the Present Invention

In the exemplary embodiments, the schedule and other information displayed on the user interface can be printed out from an image forming apparatus, such as an MFP.

In a case where highly correlated processes are present in processes constituting a workflow for carrying out a print order from an ordinary user, the processes are grouped by job type and the grouped processes are continuously executed. Therefore, the processes can be optimally scheduled. Additionally, since the movement attribute (movable/unmovable) is added to each process group, it is not necessary to perform the determination whether other processes are movable or the optimization of the schedule again at a time when a process is rescheduled. Therefore, the schedule can be dynamically changed and set at any time.

Furthermore, the present invention may be realized by supplying a computer readable storage medium to a system or apparatus, and reading and performing executable code stored in the computer readable storage medium with a computer (or CPU) in the system or apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-058062 filed Mar. 2, 2005, which is hereby incorporated by reference herein in its entirety.

What is claimed is:

1. An image processing apparatus for controlling a schedule of processes constituting a workflow to carry out a print order, the image processing apparatus comprising:

a dividing unit configured to analyze an input print order and divide the print order into a plurality of processes to carry out the print order;

a schedule arranging unit configured to arrange a schedule of the plurality of processes;

a grouping unit configured to group a set of processes together from the plurality of processes according to grouping attributes of the plurality of processes, the set of processes being associated with each other by the grouping attributes; and a first output unit configured to output the plurality of processes whose schedule is arranged by the schedule arranging unit in a recognizable manner, wherein the schedule arranging unit is configured to arrange the schedule of the plurality of processes such that the set of processes is capable of being executed continuously, wherein the first output unit is configured to output the set of grouped processes in a recognizable manner such that the set of grouped processes appears as a single process, and the schedule arranging unit is configured to, in a case where the schedule is rearranged, move and reassign the set of grouped processes in units of the set of grouped processes such that the set of grouped processes are interlocked with each other.

2. The image processing apparatus according to claim 1, further comprising a reading unit configured to read a workflow setting file in which attributes of the plurality of processes are described, the workflow setting file being created in advance by a workflow editor, wherein the grouping unit is configured to group a set of associated processes together according to grouping attributes of the plurality of processes described in the workflow setting file.

3. The image processing apparatus according to claim 1, further comprising, a first determining unit configured to determine whether the set of grouped processes is movable or unmovable in the arranged schedule on the basis of movement attributes in a process group described in a workflow setting file;

a second output unit configured to output the movement attributes in a recognizable manner; and a second determining unit configured to determine as a first determination whether the set of grouped processes is capable of being assigned on the basis of unoccupied time in the current schedule, and determine as a second determination whether, in a case where the set of grouped processes has been determined to be incapable of being assigned in the first determination, if a first process temporarily assigned in the schedule is determined to be movable on the basis of the movement attribute of the first process, wherein the set of grouped processes is capable of being assigned by reassigning the first process.

4. The image processing apparatus according to claim 3, further comprising a display unit configured to display a user interface, wherein at least one of the plurality of processes whose schedule is arranged and the movement attributes are displayed on the user interface.

5. The image processing apparatus according to claim 3, further comprising a third determining unit configured to determine whether a scheduled group is movable or unmovable on the basis of movement attributes described in the workflow setting file.

6. The image processing apparatus according to claim 2, wherein the schedule is automatically arranged by reading the workflow setting file.

7. The image processing apparatus according to claim 2, further comprising a manual schedule arranging unit configured to allow the schedule to be manually arranged on a user interface.

8. A computer readable storage medium containing computer-executable instructions for controlling a schedule of processes constituting a workflow to carry out a print order, the computer readable medium comprising:

computer-executable instructions for analyzing an input print order and dividing the print order into a plurality of processes to carry out the print order;

computer-executable instructions for arranging a schedule of the divided plurality of processes;

computer-executable instructions for grouping a set of processes together in the plurality of processes into which the print order is divided according to grouping attributes of the plurality of processes, the set of processes being associated with each other by the grouping attributes; and computer-executable instructions for outputting the plurality of processes in a recognizable manner, wherein the schedule is arranged such a way that the set of processes is capable of being executed continuously, wherein the set of grouped processes are output in a recognizable manner such that the set of grouped processes appears as a single process, and wherein the set of grouped processes are arranged in units of the set of grouped processes such that the set of grouped processes are interlocked with each other.

9. The computer readable storage medium according to claim 8, further comprising computer-executable instructions for reading a workflow setting file in which attributes of the plurality of processes are described, the workflow setting file being created in advance by a workflow editor, wherein a set of associated processes are grouped together according to grouping attributes of the plurality of processes described in the workflow setting file.

10. The computer readable storage medium according to claim 8, further comprising, a first set of computer-executable instructions for determining whether the set of grouped processes is movable or unmovable in the arranged schedule on the basis of movement attributes in a process group described in a workflow setting file;

a second set of computer-executable instructions for outputting the movement attributes in a recognizable manner; and a second set of computer-executable instructions for determining as a first determination whether the set of grouped processes is capable of being assigned on the basis of unoccupied time in the current schedule, and determining as a second determination whether, in a case where the set of grouped processes has been determined to be incapable of being assigned in the first determination, if a first process temporarily assigned in the schedule is determined to be movable on the basis of the movement attribute of the first process, the set of grouped processes is capable of being assigned by reassigning the first process.

11. The computer readable storage medium according to claim 10, further comprising computer-executable instructions for displaying a user interface, wherein at least one of the plurality of processes whose schedule is arranged and the movement attributes are displayed on the user interface.

12. The computer readable storage medium according to claim 10, further comprising a third set of computer-executable instructions for determining whether a scheduled group is movable or unmovable on the basis of movement attributes described in the workflow setting file.

13. The computer readable storage medium according to claim 9, wherein the schedule is automatically arranged by reading the workflow setting file.

14. The computer readable storage medium according to claim 9, further comprising computer-executable instructions for allowing the schedule to be manually arranged on a user interface.

* * * * *